(12) United States Patent
Bakalis et al.

(10) Patent No.: US 11,836,743 B2
(45) Date of Patent: Dec. 5, 2023

(54) SYSTEMS AND METHODS FOR SECURING COMMUNICATION DATA AND PROPERTY USING BLOCKCHAIN

(71) Applicants: Konstantinos Bakalis, Brooklyn, NY (US); Alexandros Bakalis, Brooklyn, NY (US)

(72) Inventors: Konstantinos Bakalis, Brooklyn, NY (US); Alexandros Bakalis, Brooklyn, NY (US)

( * ) Notice: Subject to any disclaimer, the term of this patent is extended or adjusted under 35 U.S.C. 154(b) by 0 days.

(21) Appl. No.: 17/672,429

(22) Filed: Feb. 15, 2022

(65) Prior Publication Data

US 2022/0277317 A1 Sep. 1, 2022

Related U.S. Application Data

(63) Continuation of application No. 16/368,844, filed on Mar. 28, 2019, now Pat. No. 11,257,098, which is a
(Continued)

(51) Int. Cl.
*G06F 21/00* (2013.01)
*G06Q 30/018* (2023.01)
(Continued)

(52) U.S. Cl.
CPC ..... *G06Q 30/0185* (2013.01); *G06K 7/10722* (2013.01); *G06K 7/12* (2013.01);
(Continued)

(58) Field of Classification Search
CPC ........... G06Q 30/0185; G06Q 10/0833; G06K 7/10722; G06K 7/12; G06K 7/1413;
(Continued)

(56) References Cited

U.S. PATENT DOCUMENTS

| 6,366,696 | B1 | 4/2002 | Hertz et al. |
| 9,641,338 | B2 | 5/2017 | Sriram et al. |

(Continued)

FOREIGN PATENT DOCUMENTS

| CN | 106709734 A | 5/2017 |
| CN | 109146024 A | 1/2019 |

(Continued)

OTHER PUBLICATIONS

Anonymous: "Getting Smart: Contracts on the Blockchain", May 1, 2016 (May 1, 2016), XP055408890, Retrieved from the Internet: URL:https://www.iif.com/system/files/32370_132_smartcontracts_report_may_2016_vf.pdf; [retrieved on Sep. 21, 2017] I*p. 5*.
(Continued)

*Primary Examiner* — Kendall Dolly
(74) *Attorney, Agent, or Firm* — WEBER ROSSELLI & CANNON LLP

(57) ABSTRACT

Blockchain-based systems and methods are used to control access to property. One system includes a mobile device, a key fob, and a server. The mobile device generates an encrypted code and transmits it to the key fob. The key fob transmits the encrypted code to the property and the server updates a log of the key fob in a hyper ledger. The property includes a computing device that validates the encrypted code and grants a key fob user access to the property. Another system includes a server that validates an access key and a first station that transmits an access key to a second station via the server and a satellite. The second station transmits data to the first station via the server and the satellite. The server saves a transmission log in a hyper ledger and transmits the access key in response to a request by the first station.

18 Claims, 19 Drawing Sheets

Related U.S. Application Data continuation of application No. 16/156,570, filed on Oct. 10, 2018, now Pat. No. 10,878,429.

(60) Provisional application No. 62/684,190, filed on Jun. 13, 2018, provisional application No. 62/649,464, filed on Mar. 28, 2018.

(51) Int. Cl.

| | | |
|---|---|---|
| *G06K 7/14* | (2006.01) | |
| *G06K 7/10* | (2006.01) | |
| *G06K 7/12* | (2006.01) | |
| *H04L 9/06* | (2006.01) | |
| *H04L 9/08* | (2006.01) | |
| *H04L 9/30* | (2006.01) | |
| *H04L 9/00* | (2022.01) | |

(52) U.S. Cl.
CPC ......... *G06K 7/1413* (2013.01); *G06K 7/1417* (2013.01); *H04L 9/0643* (2013.01); *H04L 9/0827* (2013.01); *H04L 9/0861* (2013.01); *H04L 9/30* (2013.01); *H04L 9/50* (2022.05)

(58) Field of Classification Search
CPC ... G06K 7/1417; H04L 9/0643; H04L 9/0827; H04L 9/0861; H04L 9/30; H04L 9/50; H04L 2209/80; H04L 2209/84; H04L 9/0825; H04L 9/3213; H04L 9/3239; H04W 4/029
See application file for complete search history.

(56) References Cited

U.S. PATENT DOCUMENTS

| | | | |
|---|---|---|---|
| 9,641,342 B2 | 5/2017 | Sriram et al. | |
| 10,291,395 B1 | 5/2019 | Nenov et al. | |
| 10,581,847 B1 | 3/2020 | Sun et al. | |
| 10,992,649 B2* | 4/2021 | Lobban | H04L 63/0442 |
| 2003/0183685 A1 | 10/2003 | Moore et al. | |
| 2006/0271787 A1 | 11/2006 | DeYoung et al. | |
| 2007/0220614 A1 | 9/2007 | Ellis et al. | |
| 2014/0169564 A1 | 6/2014 | Gautama et al. | |
| 2014/0304183 A1 | 10/2014 | Zabar | |
| 2014/0365284 A1 | 12/2014 | Upadhya et al. | |
| 2015/0178521 A1 | 6/2015 | Ching | |
| 2015/0371224 A1 | 12/2015 | Lingappa | |
| 2016/0098723 A1 | 4/2016 | Feeney | |
| 2016/0098730 A1 | 4/2016 | Feeney | |
| 2016/0132704 A1 | 5/2016 | Engels et al. | |
| 2016/0164884 A1 | 6/2016 | Sriram et al. | |
| 2016/0180135 A1 | 6/2016 | Dearing et al. | |
| 2016/0261411 A1* | 9/2016 | Yau | G06Q 20/38215 |
| 2016/0321677 A1 | 11/2016 | Dobaj | |
| 2016/0330027 A1 | 11/2016 | Ebrahimi | |
| 2017/0024579 A1 | 1/2017 | Lacey | |
| 2017/0032382 A1 | 2/2017 | Shulman et al. | |
| 2017/0039575 A1 | 2/2017 | Kang | |
| 2017/0083860 A1 | 3/2017 | Sriram et al. | |
| 2017/0161978 A1 | 6/2017 | Wishne | |
| 2017/0237553 A1 | 8/2017 | Sriram et al. | |
| 2017/0243193 A1 | 8/2017 | Manian et al. | |
| 2017/0257358 A1* | 9/2017 | Ebrahimi | H04L 63/083 |
| 2017/0262862 A1 | 9/2017 | Aljawhari | |
| 2017/0286974 A1 | 10/2017 | Weiss et al. | |
| 2017/0300905 A1 | 10/2017 | Withrow et al. | |
| 2017/0352215 A1 | 12/2017 | Maiwand et al. | |
| 2018/0005239 A1 | 1/2018 | Schlesinger et al. | |
| 2018/0012008 A1 | 1/2018 | Withrow et al. | |
| 2018/0012311 A1 | 1/2018 | Small et al. | |
| 2018/0108024 A1 | 4/2018 | Greco et al. | |
| 2019/0044727 A1 | 2/2019 | Scott et al. | |
| 2019/0114584 A1 | 4/2019 | Toohey et al. | |
| 2019/0188704 A1 | 6/2019 | Grendon et al. | |
| 2022/0078029 A1* | 3/2022 | Galdo | H04L 9/3265 |

FOREIGN PATENT DOCUMENTS

| | | |
|---|---|---|
| JP | 2006338694 A | 12/2006 |
| JP | 2007179324 A | 7/2007 |
| JP | 2007323297 A | 12/2007 |
| JP | 2008090831 A | 4/2008 |
| JP | 2012178147 A | 9/2012 |
| JP | 6258557 B1 | 1/2018 |
| JP | 2018506128 A | 3/2018 |
| JP | 2018055203 A | 4/2018 |
| WO | 2016089832 A1 | 6/2016 |
| WO | 2017165909 A1 | 10/2017 |
| WO | 2018020373 A1 | 2/2018 |

OTHER PUBLICATIONS

Extended European Search Report issued in European Patent Application No. 19820585.8 dated Mar. 29, 2022.
High Value Data Sharing Protocol amongst the immigration authorities of the Five Country Conference. assets.publishing.service.gov.uk. Dec. 9, 2010. [Retrieved on: Jul. 3, 2019]. (Year: 2010).
J. d. La Beaujardiere, R. Mital and R. Mital, "Blockchain Application Within A Multi-Sensor Satellite Architecture," IGARSS 2019—2019 IEEE International Geoscience and Remote Sensing Symposium, 2019, pp. 5293-5296, doi: 10.1109/IGARSS.2019.8898117. (Year: 2019).
Non-Final Office Action issued in U.S. Appl. No. 16/415,711 dated Jan. 27, 2022.
Notice of Allowance issued in U.S. Appl. No. 16/156,570 dated Oct. 15, 2020, 22 pages.
Notice of Allowance issued in U.S. Appl. No. 16/368,844 dated Oct. 20, 2021.
Office Action issued in U.S. Appl. No. 16/368,844 dated May 3, 2021.
O'Gorman et al. Secure Identification Documens via Pattern Recognition and Public-Key Cryptography. IEEE Transactions on Pattern Analysis and Machine Intelligence, vol. 20, No. 10. Oct. 1998. [Retrieved on: Oct. 8, 2020]. entire document (Year: 1998).
PCT Search Report and Written Opinion issued in corresponding application No. PCT/US19/023324 dated Jul. 2, 2019.
PCT Search Report and Written Opinion issued in related PCT Application No. PCT/US 19/37124 dated Oct. 18, 2019, 13 pages.
Sheng Cao, Sixuan Dang, Yuan Zhang, Wei Wang, Nan Cheng,A blockchain-based access control and intrusion detection V framework for satellite communication systems, Computer Communications, vol. 172, 2021, pp. 216-225 https://doi.org/10.1016/j.comcom.2021.03.023. (Year: 2021).
U.S. Office Action issued in U.S. Appl. No. 16/156,570 dated Apr. 28, 2020.
U.S. Office Action issued in U.S. Appl. No. 16/415,711 dated Jun. 16, 2021.
First Examination Report issued in Indian Application No. 202027046548 dated Aug. 1, 2022 with English translation.
First Examination Report issued in Indian Patent Application No. 202127001481 dated Sep. 19, 2022, with English translation.
Japanese Office Action issued in Japanese Patent Application No. 2021-502703 dated May 30, 2023 with English translation.
Examination report No. 1 issued in Australian Patent Application No. 2019287566 dated Sep. 5, 2023.
Notice of Reasons for Refusal issued in Japanese Patent Application No. 2021-519522 dated Aug. 22, 2023 with English translation.

* cited by examiner

SYSTEMS AND METHODS FOR SECURING COMMUNICATION DATA AND PROPERTY USING BLOCKCHAIN

FIELD

This disclosure relates to systems and methods for securing communication data using blockchain. In particular, this disclosure relates to systems and methods for validating communication data prior to communicating the data and for saving communication data in a hyper ledger using blockchain.

BACKGROUND

Data communications are critical in most industries. For decades, many industries utilize satellites for their data communications. Those industries have invested large sums of money and human resources to secure or protect the data communications, especially when those data communications are utilized to control access to various types of property. Many businesses and people have developed and are continuing to develop security systems to protect various types of property from unlawful or unapproved access to or entry into the property, and to protect associated communication data from being hacked or hijacked. Physical locks have been developed in accordance with the needs, requirements, and characteristics of the property. Physical keys corresponding to the physical locks have been likewise developed. However, physical keys are exposed to various risks including the risk of being copied and/or stolen. Further, hacking techniques have been developed to counter advancements in security technology.

SUMMARY

This disclosure relates to improvements in securing data communications by using blockchain technology so that unauthorized data communication or access can be easily found and tracked, and security against unauthorized and potential breaches can be provided to business or personal properties or in data communication with high reliability.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes an e-key system. The e-key system includes: a mobile device configured to generate an encrypted code; a key fob configured to receive the encrypted code from the mobile device and to transmit the encrypted code to a computing device incorporated into property via wireless communication; and a server configured to update an access log of the key fob in a hyper ledger. The computing device includes a validation module configured to validate the received encrypted code, and the computing device grants a user of the key fob access to the property when the validation module validates the encrypted code. Other embodiments of this aspect include corresponding computer systems, apparatus, and computer programs recorded on one or more computer storage devices, each configured to perform the actions of the e-key system.

Implementations may include one or more of the following features. The wireless communication may be Bluetooth communication. The mobile device and the key fob may be paired according to a Bluetooth protocol. The computing device of the property and the key fob may be paired according to a Bluetooth protocol. The validation module may be constantly powered by the property. The validation module may be an electronic circuit. The code may be encrypted with a public key by the mobile device. The validation module may decrypt the encrypted code with a private key, which is saved in the validation module, corresponding to the public key. The validation module may transmit the access log to the server when a network connection is established with the server. The property may be an aircraft, watercraft, hovering vehicle, land vehicle, or building.

Another general aspect includes a method for granting access to property to a user of a key fob. The method includes: transmitting, by a mobile device, an encrypted code to a key fob; transmitting, by the key fob, the encrypted code to a validation module running on a computing device of property via wireless communication; determining, by the validation module, whether the encrypted code is valid; granting access to the property when it is determined that the encrypted code is valid; and denying access to the property when it is determined that the encrypted code is invalid. Other embodiments of this aspect include corresponding computer systems, apparatus, and computer programs recorded on one or more computer storage devices, each configured to perform the actions of the method.

Implementations may include one or more of the following features. The wireless communication may be Bluetooth. The property and the key fob may be paired according to a Bluetooth protocol. The mobile device and the key fob may be paired according to a Bluetooth protocol. The encrypted code may be encrypted by a public key. The method may further include decrypting, by the validation module, the encrypted code with a private key, which is saved in the validation module, corresponding to the public key. The method may further include transmitting, by the validation module, an access log to a server when a network connection is established with the server. The property may be an aircraft, watercraft, hovering vehicle, land vehicle, or building. Implementations of the described techniques may include hardware, a method or process, or computer software stored on a computer-accessible medium.

Another general aspect includes a satellite data communication system, which includes: a server configured to validate an access key; a first station configured to transmit an access key via the server and a satellite; and a second station configured to receive the access key and to transmit data to the first station via the server and the satellite when the server validates the access key. The server saves a transmission log in a hyper ledger using blockchain and the server transmits the access key in response to a request by the first station. Other embodiments of this aspect include corresponding computer systems, apparatus, and computer programs recorded on one or more computer storage devices, each configured to perform the actions of the satellite data communication system.

Implementations may include one or more of the following features. The transmission log may include a validation history of the access key. The satellite may not permitted to transmit the data from the second station to the first station when the access key is not validated. The satellite may be permitted to transmit the data from the second station to the first station when the access key is validated. The second station may transmit the access key to the server when the second station receives the access key from the first station. The access key may be encrypted by the server. The server may be further configured to encrypt data before transmitting data to the satellite. The server may be further configured to save the encrypted data in a hyper ledger. The second station may be further configured to encrypt the data using a public key. The first station may be further configured to decrypt the data using a private key corresponding to the public key. The first and second stations may be military stations. The access key may be valid for data transmission for a period set by the server or the second station. The server may block the data transmission between the first and second stations after the set period elapses. Implementations of the described techniques may include hardware, a method or process, or computer software stored on a computer-accessible medium.

Another general aspect includes a method for securing satellite data communications between first and second stations. The method includes: transmitting, by the first station, a request for an access key to a server via a satellite; receiving, by the first station, an access key from the server; transmitting, by the first station, the access key to the second station; transmitting, by the second station, the access key to the server; validating, by the server, the access key transmitted by the second station; permitting satellite data communications between the first station and the second station when the server determines that the access key is valid; and storing, by the server, a transmission log in a hyper ledger. Other embodiments of this aspect include corresponding computer systems, apparatus, and computer programs recorded on one or more computer storage devices, each configured to perform the actions of the method.

Implementations may include one or more of the following features. The transmission log may include a validation history of the access key. The transmission of the data may be blocked when the server determines that the access key is not valid. The access key may be encrypted by the server. The satellite data communications may be encrypted before being transmitted to the first station. The encrypted satellite data communications may be saved in the hyper ledger. The method may further include encrypting, by the second station, the satellite data communications with a public key before transmitting the satellite data communications to the first station. The method may further include decrypting, by the first station, the encrypted satellite data communications with a private key corresponding to the public key. The access key may be valid for satellite data communications for a period set by the server or the second station. The satellite data communications may be blocked between the first and second stations after the set period. Implementations of the described techniques may include hardware, a method or process, or computer software stored on a computer-accessible medium.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized. It will be appreciated that for simplicity and clarity of the illustration, elements shown in the figures referenced below are not necessarily drawn to scale.

DETAILED DESCRIPTION

Figure 1:
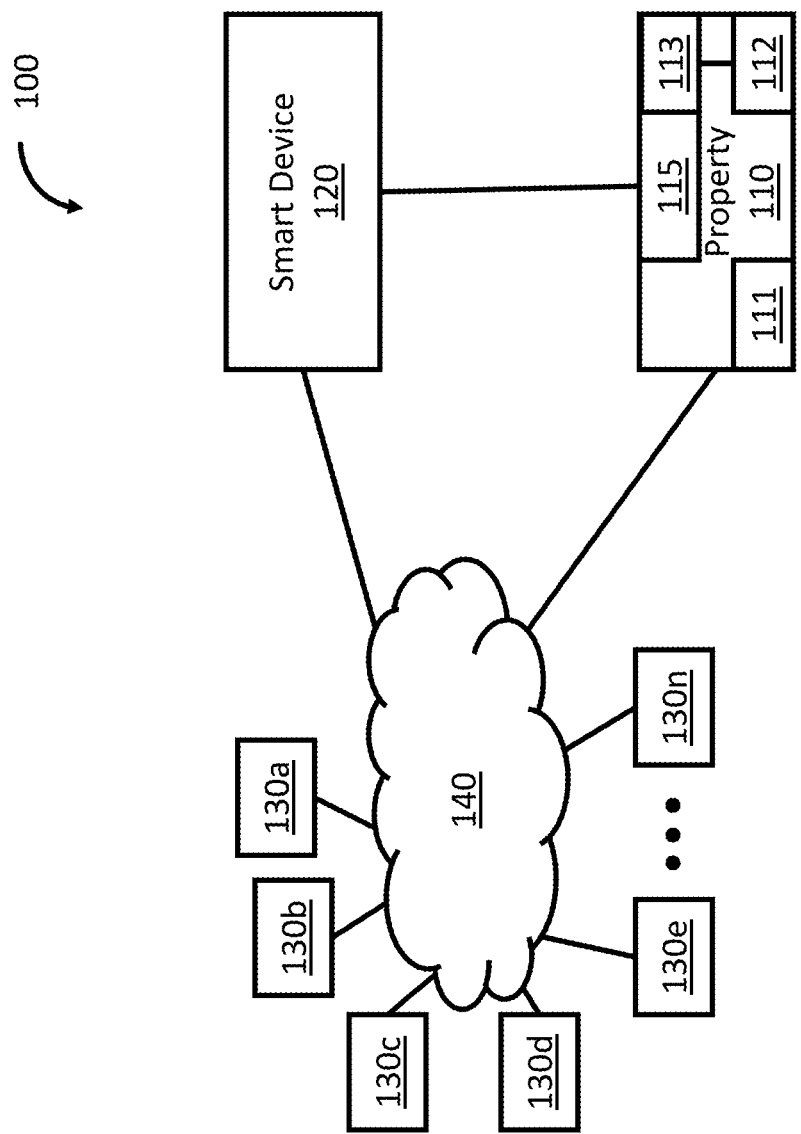
FIG. 1 is a diagram illustrating an e-key system for providing secure and safe ways to protect against unlawful or unapproved access to property in accordance with embodiments of the present disclosure.

This disclosure relates to systems and methods for securing data communications and property using blockchain. In particular, this disclosure relates to systems and methods for securing satellite and wireless communication between a mobile device and personal or business property using blockchain technology so as to increase the security level and protect the communication data and properties against unintended, unlawful, or unapproved attempts to access or tamper with the communication data or property. Embodiments and aspects of securing data communications and property are described with respect to the figures set forth below.

Wireless key systems have been developed particularly in automobile industries. Wireless key systems generally use radio signals in communicating with vehicles. A holder of the wireless key presses a button on the wireless key, which then communicates with a communication device of the property by transmitting a radio signal to the communication device. When the transmitted radio signal matches the code saved in the property, the holder can gain access to the property. However, the radio signal can be intercepted or hijacked by a simple electronic gadget located near the wireless key. A person intercepting the radio signal can use the intercepted radio signal to gain access to the property without the owner knowing. Thus, communications using the wireless key systems are exposed to risks of being hacked or intercepted.

Furthermore, since the radio signal saved in the wireless key is generally predetermined or unchanged, a hacker can copy or mimic the radio signal to gain access to the property. Thus, the predetermined radio signal is also exposed to risks of being hacked or copied.

Still further, in general, data which is transmitted wirelessly or via wire is exposed to risks of hacking so that important personal, financial, tactical, medical, military, or secret data may be lost, modified, or used for unintended purposes. Therefore, there is a need to develop more secure and safer ways to protect communication data and track and secure entry or access to business or personal property.

E-Key System

The e-key system may be applied, for example, to a business building, a residential house, a land vehicle, an air vehicle, or a marine vehicle. In aspects, the e-key system may be applied to any property including business or personal buildings, properties, safes, vehicles, machines, or any other things that need protection against unintended, unlawful, unauthorized, or unapproved access or use of those things (e.g., unlawful entry to a person's home or unauthorized starting of an car engine). Further, the e-key system saves access or use history in a hyper ledger using blockchain technology and can track every access to or use of properties so that security is preserved and guaranteed.

Further, wireless e-keys communicate with computing devices incorporated into or associated with the properties using end-to-end encryption (E2EE) to prevent hijacking of communication data, which includes the codes described herein, during transmission, thereby increasing reliability and security.

FIG. 1 shows an e-key system 100 according to embodiments of this disclosure. The e-key system 100 includes property 110, which includes an entry 115, a communications device 111, and a computing device 112 in communication with the communications device 111, a smart device 120, and servers 130a-130n, which are connected to each other through a network 140. The e-key system 100 wirelessly and selectively grants access to an entry 115 of the property 110 or wirelessly and selectively grants use of the property. The entry 115 may be a door or a lock. And the use may be starting an engine or powering an electric motor associated with the property 110 (e.g., a truck or an electric car). In particular, if the property 110 is a land vehicle, the entry 115 may be a door to get into the land vehicle; if the property 110 is an air or marine vehicle, the entry 115 may be a door of the air or marine vehicle or the use may be starting an engine so that a user can control or operate the air or marine vehicle; or if the property 110 is a building or a safe, the entry 115 may be one or more doors. The above list of the property 110 and the associated entry 115 or use are not intended to be limited thereto but to provide examples. Other types of properties, entries, and uses are readily understood by those having ordinary skill in the art without departing from the spirit of this disclosure.

The smart device 120 works or functions as a wireless key in the e-key system 100. The smart device 120 receives a code from one or more of the servers 130a-130n. The code may be randomly generated by the servers 130a-130n and works as an authorized key to the entry 115 or use of the property 110. The smart device 120 may wirelessly receive the code through the network 140, which may be the Internet, a local area network, a wide area network, an ad hoc network, or any other network capable of wireless transmission of data including the code.

The smart device 120 may be a cellphone, personal digital assistant (PDA), tablet, phablet, computer, portable computer, smart watch, or any other compatible computing device, which is capable of communicating with the one or more servers 130a-130n by using a first wireless communication method and with the computing device (not shown) of the property 110 by using a second wireless communication method different from the first wireless communication method. The computing device of the property 110 may be the same computing device used to control or operate the property 110.

When the smart device 120 receives the code through the network 140, the servers 130a-130n also transmit the code to the computing device of the property 110 through the network 140 via a wireless communication method, and, in turn, the computing device of the property 110 saves the code in memory, which may be incorporated into the computing device or the property 110. In this way, the computing device of the property 110 may check whether the code transmitted from the smart device 120 is the same as the code saved in the memory of the property 110 or the computing device. The wireless communication method used between a communication device (e.g., a wireless transceiver) coupled to the one or more servers 130a-130n and the communication devices or electronics coupled to the smart device 120 or the computing device of the property 110 may be Wi-Fi, 2G-5G GSM, TDMA, CDMA, long term evolution (LTE), or any other communication method used for long-distance communication.

During the transmission of the code, the smart device 120 uses another wireless communication method different from the wireless communication method used between the one or more servers 130a-130n and the smart device 120 or the computing device of the property 110. The other wireless communication method may be near field communication (NFC), Bluetooth, Bluetooth low energy (BLE), ZigBee, infrared (IR), or radio frequency identification (RFID). This list merely provides examples of the wireless communication method used between the smart device 120 and the communication device of the property 110. However, other kinds of wireless communication methods may be employed without departing the spirit of this disclosure.

The range of communication between the smart device 120 and communication device of the property 110 may be shorter than the range of communication between the smart device 120 and one or more of the servers 130a-130n or between the communication device of the property 110 and one or more of the servers 130a-130n. In aspects, the communication device of the property 110 may be directly connected to one or more of the servers 130a-130n, in a case where the property 110 is immovable, such as a residential or commercial building, a laboratory, a house, etc.

The smart device 120 may employ E2EE to transmit the code to the communication device of the property 110. By using E2EE, no eavesdroppers can intercept and decipher the code. Only the true sender (i.e., the user of the smart device 120) and the true recipient (i.e., the owner or user of the property 110) can encrypt and decipher the code, respectively, thereby ensuring that the communications between the smart device 120 and the communication device of the property 110 is secure.

The servers 130a-130n may have the same, similar, or different structures with respect to each other. Regardless of the structure of the servers 130a-130n, each of the servers 130a-130n may save the same hyper ledger using blockchain technology. When the computing device of the property 110 creates a transaction reflecting an event in which access to the property is granted or denied, the servers 130a-130n save the transaction into the hyper ledger as a block, for example, as described in application Ser. No. 16/156,570, the entire contents of which are incorporated by reference herein. Thus, when one or more transactions are transmitted to the servers 130a-130n, a block is created and saved in servers 130a-130n. Details about creating a block are described with respect to FIG. 3 below.

Figure 2:
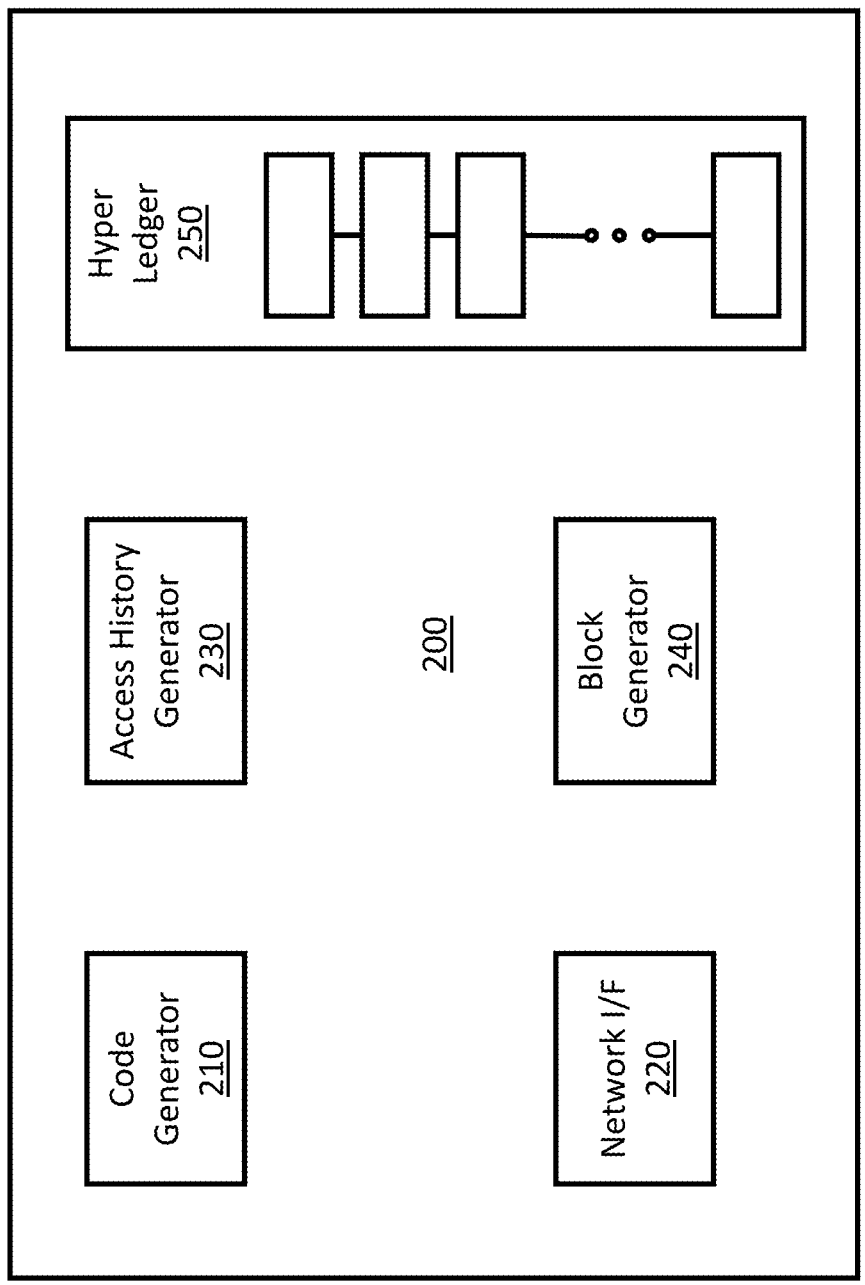
FIG. 2 is a block diagram of a server of FIG. 1, which uses blockchain technology, in accordance with embodiments of the present disclosure.

FIG. 2 is a block diagram of a server 200, which may be used as each of the servers 130a-130n of FIG. 1 and which uses blockchain in accordance with embodiments of this disclosure. The server 200 may include a code generator 210, a network interface 220, an access history generator 230, a block generator 240, and a hyper ledger 250. The code generator 210 may generate a random code upon reception of a request from the smart device 120. The size of the random code may be 16 bytes, 64 bytes, 128 bytes, 256 bytes, or longer based on a desired level of security for the property 110 or based on security requirements prescribed for the property 110. For example, if the property 110 is an automobile or a bicycle, the size of the random code may be 16 bytes. In a case where the property 110 is an aircraft, the size of the random code may be 32 bytes or longer. If the property 110 is a piece of military equipment (e.g., a fighter jet or a submarine), the size may be 128 bytes, 256 bytes, or longer. The code may be a numeric sequence, an alphanumeric sequence, a hexadecimal sequence, or any other sequence known to those skilled in the art of cryptography.

The random code generated by the code generator 210 is transmitted to the smart device 120 and the computing device of the property 110 via the network interface 220. The random code is then used by the computing of the property 110 to check whether the random code transmitted from the smart device 120 matches the code saved in memory of the property 110.

The random code may be valid or effective for a predetermined period. After the predetermined period has elapsed, the random code may be invalidated and access to the property 110 using the random code cannot be granted. To gain access, the smart device 120 would need to receive another random code from the server 200.

In an aspect, a random code may be needed to maintain access every predetermined period. In this situation, the smart device 120 receives a random code every predetermined period, transmits the random code to the computing device of the property 110, and thereby continuously receives access to the property 110. In a case where the network 140 has an issue (e.g., a communication error or disconnection) and, as a result, wireless communication does not work between the server 200 and the smart device 120 or the computing device of the property 110, the counting of the predetermined period may stop during the period when the wireless communication does not work, and then the counting may resume after the issue is resolved.

In a case where the communication device 111 of the property 110 has a network issue and is unable to communicate with the server 200 but the smart device 120 is able to communicate with the server 200, the server 200 may search the hyper ledger 250 to find out which code was the last code transmitted to the communication device 111 of the property 110 and then may transmit the last code to the smart device 120. In this way, the smart device 120 is able to gain access to the property 110 in such situations.

When the code transmitted from the smart device 120 matches the code saved in the memory 113 of the property 110, the smart device 120 is granted access to the property 110. And when the code transmitted from the smart device 120 matches the code saved in the memory 113, the smart device 120 is denied access to the property 110. In either case, the property 110 transmits, to the server 200, a result of granting or denying access to the property 110. The access history generator 230 then generates a log of the result. The log may include the addresses or identifications of the smart device 120 and the property 110 and may further include the result of granting or denying access to the property 110. The log may include a timestamp when the grant or denial of access occurs. In aspects, the log may include the network status between the smart device 120 and the communications device 111 of the property 110, between the smart device 120 and the server 200, and between the communications device 111 of the property 110 and the server 200.

Figure 3:
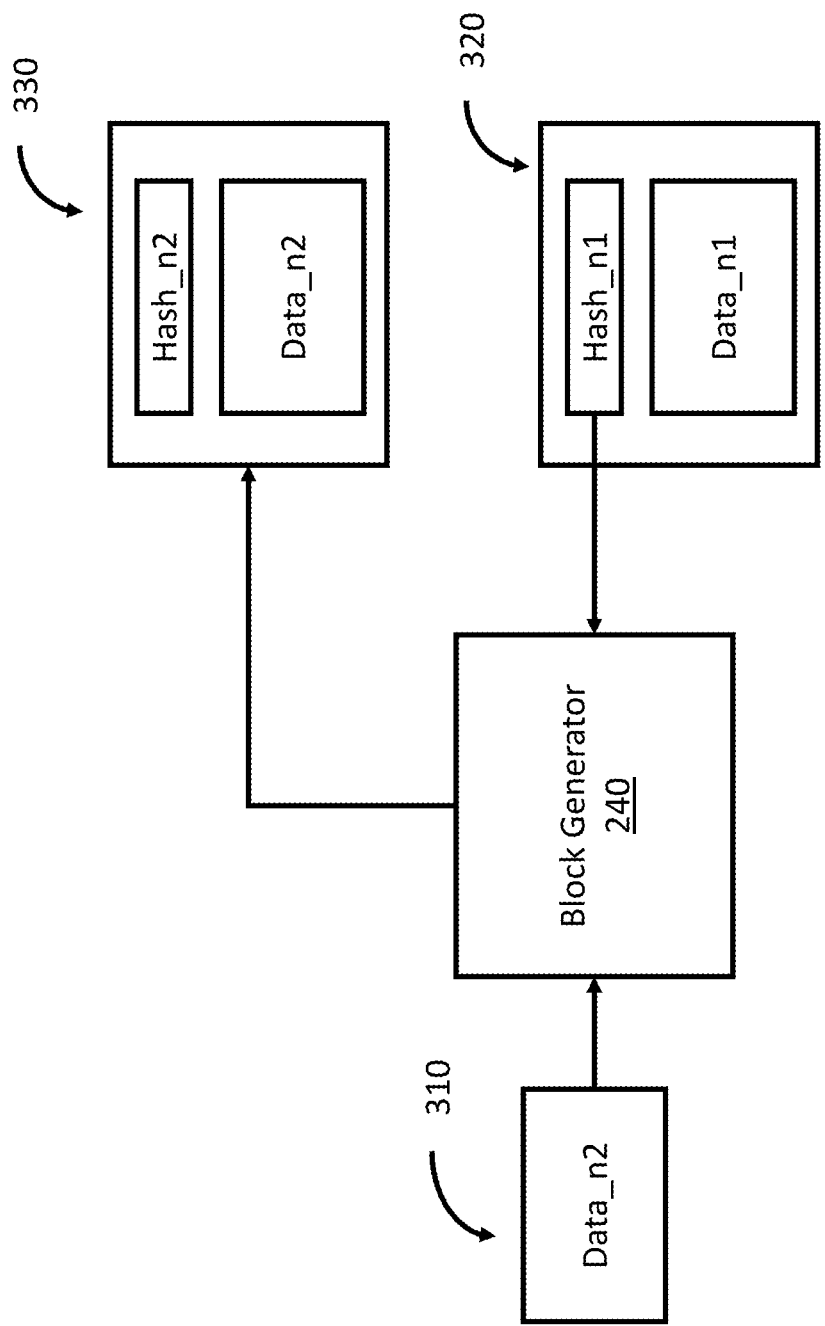
FIG. 3 is a block diagram illustrating a procedure for generating a block using blockchain technology in accordance with embodiments of the present disclosure.

After the access history log is generated or updated by the access history generator 230, the block generator 240 generates a block to be saved in the hyper ledger 250. Each block is related to its previous block. For example, FIG. 3 illustrates how blocks are related to each other and, in particular, how each block is related to a preceding block. When current log data 310 (Data_n2) comes to the block generator 240, the block generator 240 retrieves a hash code from the previous block 320.

A hash code is generated by a hash function. When the hash function receives data as input, the hash function outputs a series of alphanumeric values. One advantage of using a hash function is that the hash function outputs a series of alphanumeric values very different from the series of alphanumeric values generated from first data when second data, which is slightly different from the first data, is input to the hash function. For example, when the first data is "Sarah" and the second data is "Sara", the hash code generated from the first data is very different from the hash code generated from the second data. Thus, the usage of hash codes further increases the security level and prevents hacking.

The block generator 240 uses the current data, Data_n2, of the current block 310 and the previous hash code, Hash_n1, of the previous block 320, as input to a hash function executed by the block generator 240. The hash function then generates a current hash code, Hash_n2, and the block generator 240 generates the current block 330 by combining the current hash code, Hash_n2, and the current data, Data_n2. Since the current block 330 is partly generated from the hash code of the previous block 320, every block is related to a previous block. Thus, modifying the data content of one block is not feasible unless hash codes of all blocks starting from the original block are modified.

Referring back to FIG. 2, when the current block 330 is generated, it is saved in the hyper ledger 250. Since the blockchain technology is used in the hyper ledger 250, the hyper ledger 250 is secure against potential modifications of data saved in the hyper ledger 250. Further, the same hyper ledger 250 is saved in all the servers 130a-130n. It is impractical to modify any data saved in the hyper ledger 250 unless hash codes of all blocks saved in all the servers 130a-130n are modified at almost the same time. The reason behind the almost same time modification is that the servers 130a-130n validate each block before saving each block in the hyper ledger 250. If attempts are made to modify data in the hyper ledger 250 saved to a small group of servers 130a-130n, such attempts cannot pass the validation process and the hyper ledger 250 cannot be modified.

Figure 4:
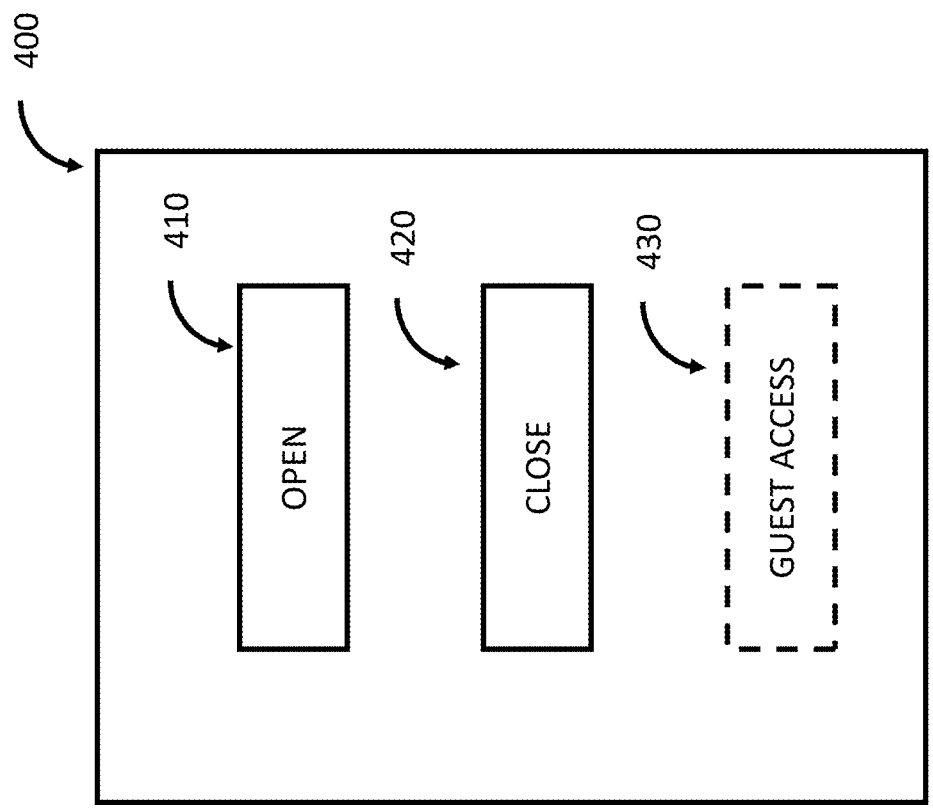
FIG. 4 is a block diagram illustrating a user interface displayed on a smart device of FIG. 1 in accordance with embodiments of the present disclosure.

FIG. 4 illustrates a user interface 400 displayed on the smart device 120 of FIG. 1 in accordance with embodiments of this disclosure. When a user of the smart device 120 installs an application for wirelessly accessing a computing device of a property and executes the application, the user interface 400 may be displayed. The application may be a mobile application retrievable from the Google Store for android-based smart devices or from the App Store for iOS-based smart devices. The application may also be found in third-party application stores.

The user interface 400 may include three buttons: an OPEN button 410, a CLOSE button 420, and a GUEST ACCESS button 430. Since the GUEST ACCESS button 430 may not be available for every user, it may not be visible to every user. The OPEN button 410 may be used to send a request for opening a door to a property to the server 200, the CLOSE button 420 may be used to send a request for closing the door to the server 200, and the GUEST ACCESS button 430 may be used to send a request for giving permission to other users to use the property to the server 200.

Figure 5:
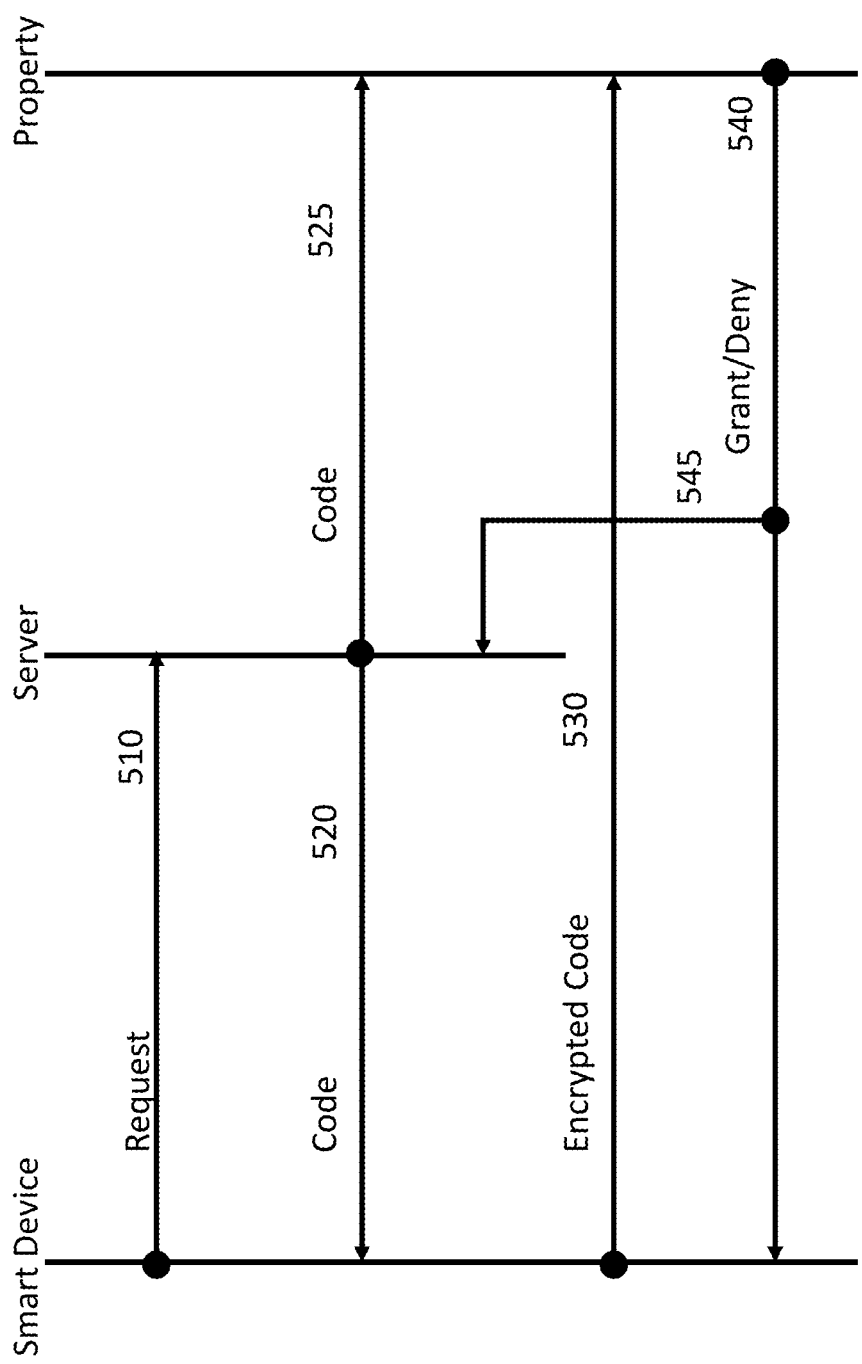
FIG. 5 is a sequence diagram illustrating a communication procedure for the e-key system in accordance with embodiments of the present disclosure.

When the OPEN button 410 or the CLOSE button 420 is clicked by the user, a process illustrated in FIG. 5 is initiated. At step 510, the smart device sends a request to the server to open or close the door of the property. Upon receipt of the request, the server generates and transmits a code (e.g., a random code) to the smart device at step 520 and to the computing device of the property at step 525. Transmission of the generated code to the smart device and the property may be simultaneously or serially performed.

The length of the code may depend from a level of security embodied in the property and/or security requirements prescribed in the property.

When the smart device receives the random code, the smart device encrypts the random code and transmits the encrypted code to the property at step 530 by using E2EE. The property deciphers the encrypted code and checks whether the deciphered code matches the code received from the server. When they match, the property grants the user of the smart device to open/close the property at step 540. If not, the property denies the user to open/close the property at step 540. The result of the grant/deny is also sent to the server at step 545.

Figure 6:
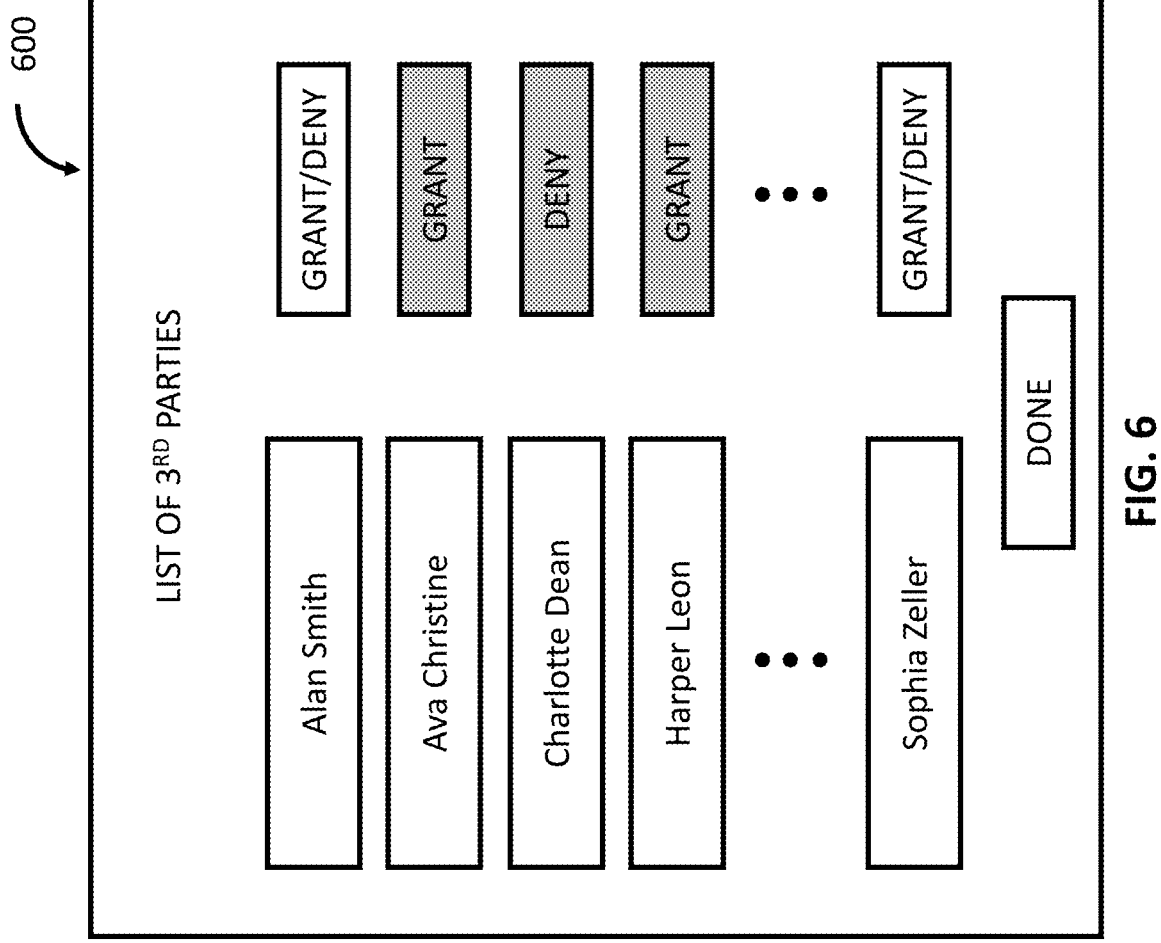
FIG. 6 is a block diagram illustrating a user interface for granting/denying access to property in accordance with embodiments of the present disclosure.

When the GUEST ACCESS button 430 is clicked, another user interface 600 may be displayed on the smart device as illustrated in FIG. 6. The user interface 600 includes a list of third parties, which were previously added to the list by the user of the smart device. The user of the smart device can add or remove third parties into the list. In aspects, the user of the smart device may be an owner, a manager, or an operator of the property and may have authority or power to give to people an access to the property.

The list includes names of peoples and status buttons informing grant/deny right next to the names. For example, as illustrated in FIG. 6, the user of the smart device has not grant or deny Alan Smith and Sophia Zeller, meaning that Alan Smith and Sophia Zeller are not allowed to open or close the door of the property. In contrast, Ava Christine and harper Leon are granted, meaning that Ava Christine and harper Leon are allowed to open or close the door of the property. Further, Charlotte Dean is specifically indicated that opening or closing the door is not allowed.

The status button may be toggled among "GRANT/DENY," "GRANT," and "DENY." Thus, the user of the smart device may be able to identify the status of a third party by clicking the status button. In aspects, there are radio buttons for "GRANT/DENY," "GRANT," and "DENY", and the user of the smart device may choose one of the radio buttons. Selection of status among "GRANT/DENY," "GRANT," and "DENY" may be done in any other ways, which can be appreciated by a person having skill in the art.

After completing selection of third parties and corresponding statuses, the user of the smart device clicks "DONE" button. Then, the smart device sends a request for third parties to the server. The request may include information of the third parties, which may include a name, physical address, email address, Internet protocol (IP) address, phone number, or media access control (MAC) address of the smart device of a third party. This list of information of the third parties are not meant to be exhaustive but to provide examples. Further specifics indicative of the third parties may be included in the information.

The smart device may send a message to the selected third parties, which guides the third parties to install the corresponding mobile application and shows how to open and close the door of the property. In aspects, the server may send the message to the selected third parties based on the information included in the request.

When a selected third party receives the message and installs the mobile application, the user interface 400 of FIG. 4 may be displayed without the GUEST ACCESS button 430, meaning that only the OPEN button 410 and the CLOSE button 420 may be displayed on the smart device of the selected third party. In other words, the selected third parties do not have an authority or power to grant or deny other third parties to open or close the door to the property.

In a case when the user of the smart device selects a third party and identifies the corresponding status as DENY, the smart device may send a message to a smart device of the selected third party, notifying that the selected third party is no longer able to open or close the door to the property. In aspects, the mobile application may be disabled so that the selected third party may not be able to execute the mobile application, or when executed, the mobile application may show a user interface indicating that no available options can be selected.

Figure 7:
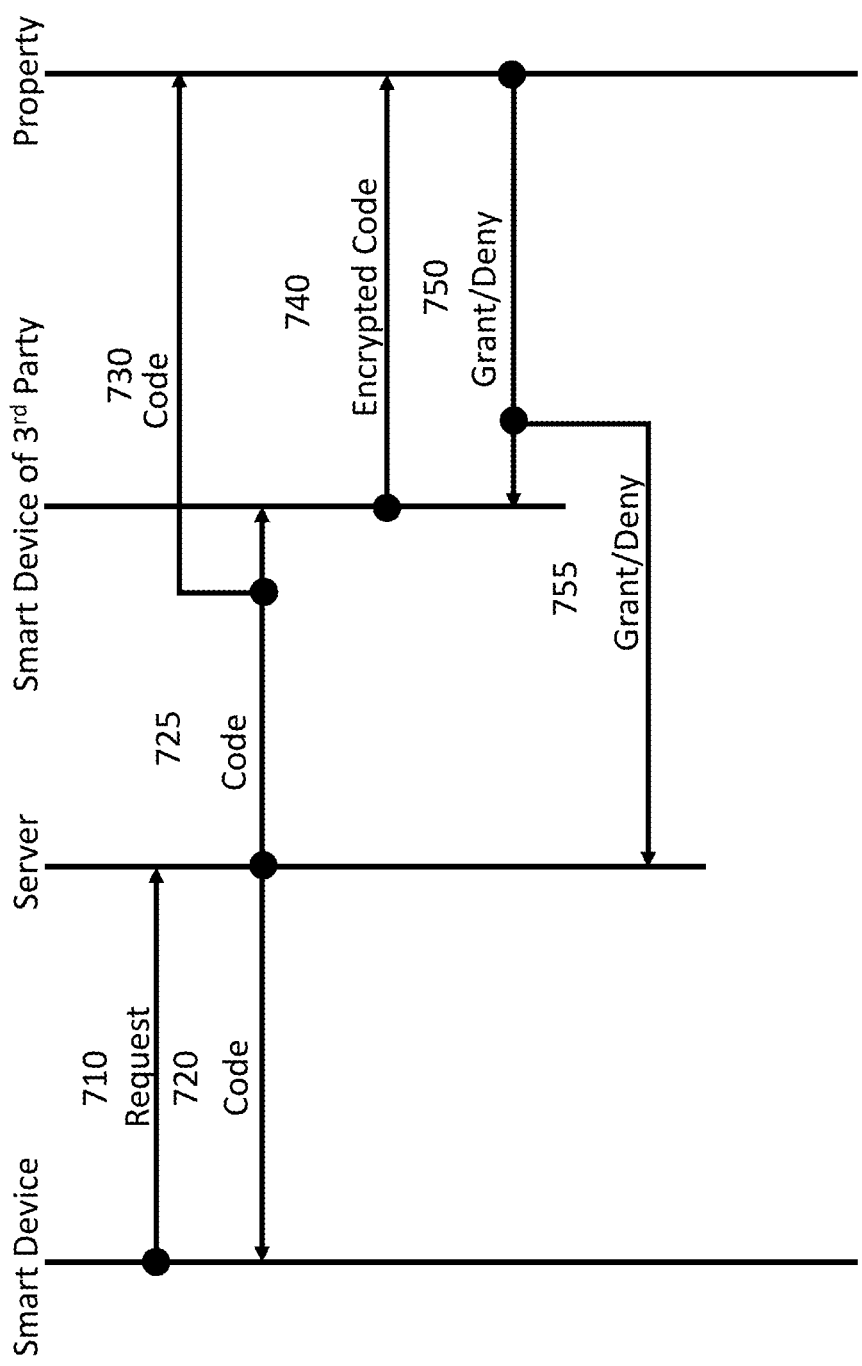
FIG. 7 is a sequence diagram illustrating a communication procedure for granting/denying access to a third party in accordance with embodiments of the present disclosure.

FIG. 7 illustrates processes for granting or denying a selected third party to open or close the door to the property in accordance with embodiments of this disclosure. At step 710, the user selects a group of third parties to grant an entry to the property and clicks the DONE button, the smart device of the user sends a request to the server. In return, the server generates a random code and transmits to the smart device of the user and the smart device of the selected third party at steps 720 and 725, respectively. Further, the server transmits the random code to the property at step 730. Transmission of the random code may be simultaneously or serially performed. In aspects, the server may transmit a message rather than the random code to the smart device of the user, indicating that the random code is transmitted to the smart device of the selected third party and the property at step 720.

At step 740, the smart device of the selected third party encrypts the random code and transmits the encrypted code to the property, which then deciphers the encrypted code. When the deciphered code matches the code saved in the property, the property grants an entry to the smart device of the selected third party at step 750 and sends the result of the grant to the server at step 755. Likewise, when the deciphered code does not match the code, a denial of the entry is sent to the server by the smart device of the selected third party at step 755.

In aspects the server or the property may send a message indicating granting or denial of the entry to the selected third party so that the user can confirm his selection of the third party and the status.

Figure 8:
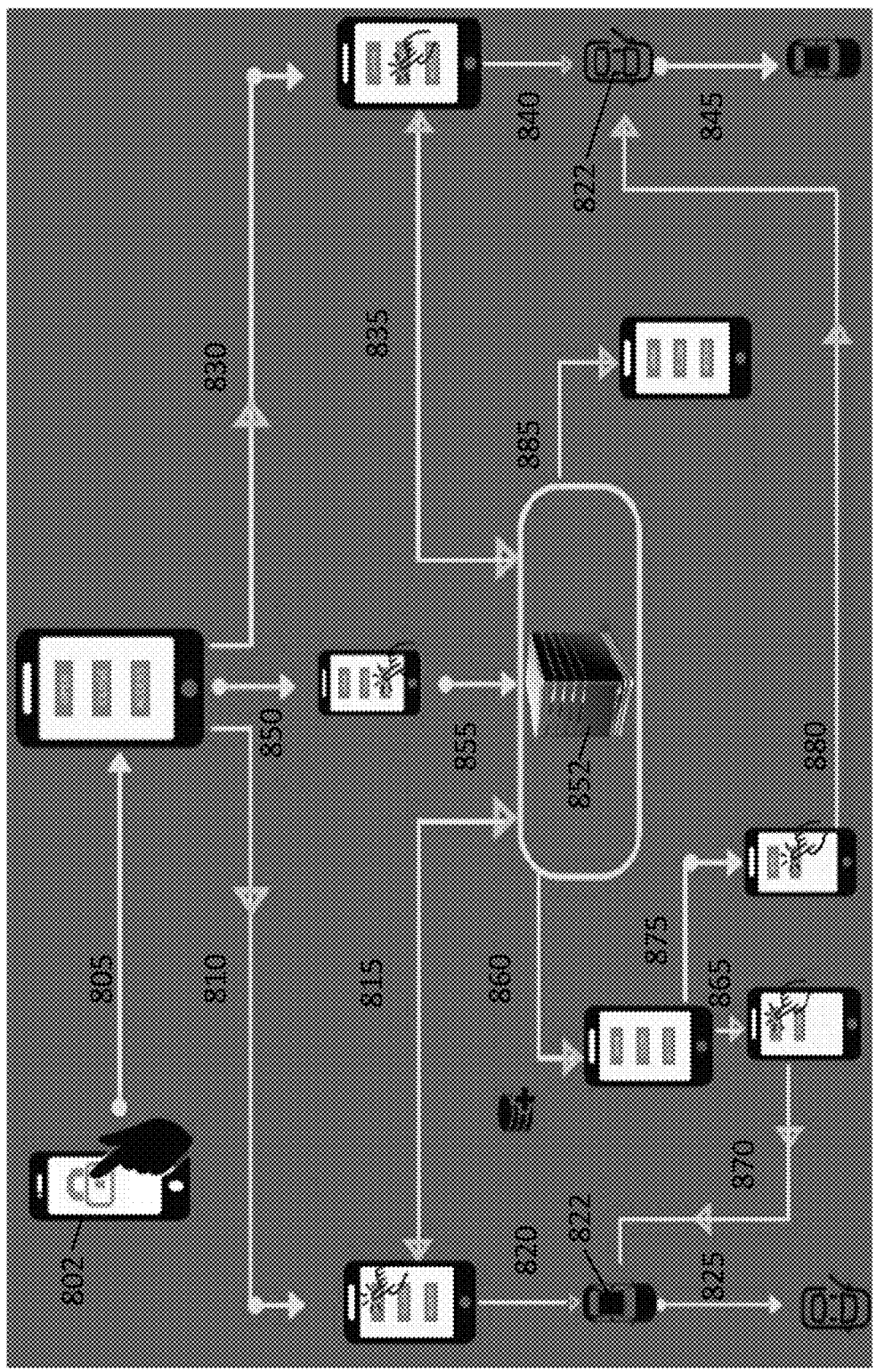
FIG. 8 is a flow diagram illustrating a method for granting/denying an access to property using a mobile application in accordance with embodiments of the present disclosure.

FIG. 8 is a graphical flow diagram illustrating the granting or denying of entry to property (e.g., an automobile) using a mobile application running on a smart device 802 in accordance with embodiments of the disclosure. At step 805, the user of the smart device initiates a mobile application by, for example, selecting an icon representing the mobile application displayed on the display of the smart device. The mobile application displays selectable buttons including OPEN, CLOSE, and ACCESS buttons. In the case where the OPEN button is selected by the user at step 810, the mobile application sends an OPEN request to the server 852 and receives a random code from the server 852 at step 815. The mobile application encrypts the random code, sends the encrypted random code to the property (e.g., automobile 822) at step 820, and the user is granted entry to the property by a computing device residing in and controlling access to the property. Then, the door to the property is opened to the user of the smart device by the computing device at step 825, which concludes the process that is performed upon the selection of the OPEN button.

When the user selects the CLOSE button in the mobile application at step 830, the mobile application sends a CLOSE request to the server 852 and receives a random code from the server 852 at step 835. The mobile application encrypts the random code, sends the encrypted random code to the property (e.g., automobile 822) at step 840, and is granted permission to close the door to the property by the computing device. Then, the door to the property is closed by the computing device at step 845, e.g., by controlling the automatic locks of the automobile 822 to close, which concludes the process that is performed upon the selection of the CLOSE button displayed by the mobile application.

When the user selects the ACCESS button at step 850, the mobile application transmits information including status information regarding selected third parties to the server 852 at step 855. When the status information regarding the selected third parties is set to DENY, the server 852 prevents the selected third parties from opening or closing the door to the property at step 885.

In the case where the status information regarding the selected third parties is set to GRANT, the server 852 may cause smart devices of the selected third parties to initiate a mobile application by transmitting a message to the mobile application, which displays buttons including an OPEN button and a CLOSE button. The mobile application may display an ACCESS button in a deactivated state so that the selected third parties cannot select the ACCESS button.

At step 865, if a selected third party clicks the OPEN button, the mobile application of the smart device of the selected third party encrypts and transmits a code received from the server 852 to the property (e.g., the automobile 822) at step 870. The computing device residing in the property then deciphers the encrypted code and determines whether the deciphered code (e.g., a random code) matches the code saved in memory of the computing device or in memory disposed in or integrated into the property. If the deciphered code matches the code saved in the memory, the computing device causes the property to open its door to the selected third party at step 825 (e.g., the computing device of the property transmits a signal to one or more of the automatic locks of the property to cause the one or more automatic locks to transition from a locked state to an unlocked state.

The code (e.g., the random code) may be transmitted from the server 852 after the selected third party clicks the OPEN button or at a time when the server 852 transmits the message to the mobile application running on the selected third party's smart device. In aspects, the message sent from the server 852 to the mobile application may include the random code.

If the selected third party clicks the CLOSE button at step 875, the mobile application of the smart device of the selected third party encrypts and transmits the code received from the server 852 to the computing device of the property at step 880. The computing device of the property then deciphers the encrypted code using a suitable decryption algorithm and determines whether the deciphered code matches the code saved in the memory of the property. If the deciphered code matches the code save in the memory of the property, the computing device of the property causes the door of the property to close at step 845.

Figure 9:
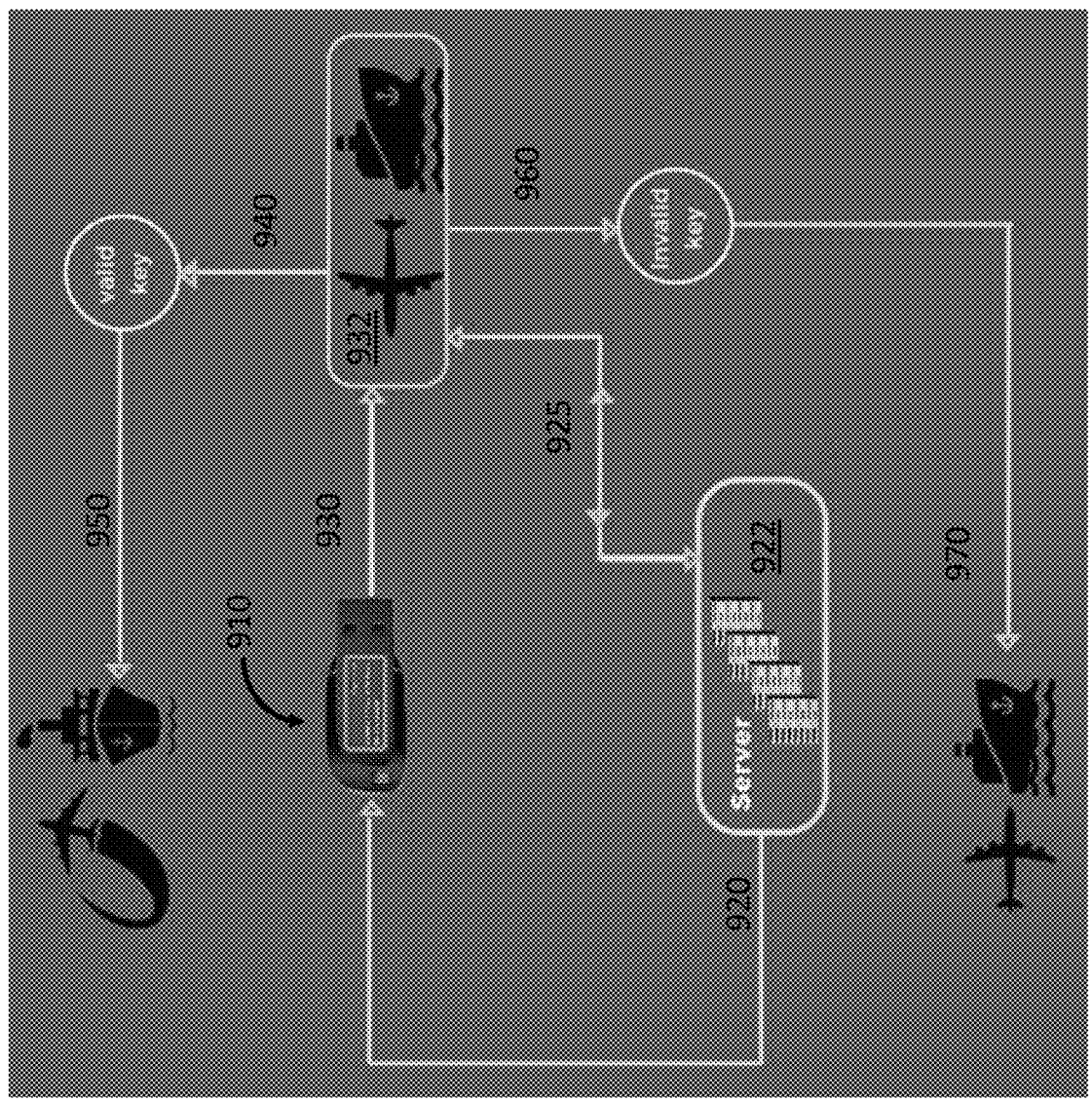
FIG. 9 is a flow diagram illustrating a method for granting/denying an access to a marine or air vehicle in accordance with embodiments of the present disclosure.

Wirelessly granting or denying entry may be applied to marine vessels and air vessels. FIG. 9 is a graphical flow diagram illustrating the granting or denying of entry to a watercraft or an aircraft using a mobile application in accordance with embodiments of the disclosure. In the embodiments of FIG. 9, the smart device may be a portable electronic device 910, such as a universal serial bus (USB) drive 910, which includes a display. The USB drive 910 is just one of many examples of electronic devices which include a display and are capable of communicating with the server 922 and the computing devices residing on or integrated into the watercraft or aircraft 932.

The watercraft or aircraft are generally more complicated and larger in size than land vehicles, thus requiring a greater level of security than land vehicles. When a request is made for entry into the marine or air vehicle, the server 922 sends at step 920 a random code, which may be longer than the random code used for land vehicles. The random code may be valid for a predetermined period. For example, the predetermined period may be 5, 10, 15, 20, 25, 30, or more minutes depending on the requirements of the watercraft or aircraft.

The received random code may be displayed on the display of the portable electronic device 910. The user of the portable electronic device 910 may type the displayed random code into the watercraft or aircraft or insert the portable electronic device 910 into a port of the watercraft or aircraft at step 930. By typing in the random code or inserting the portable electronic device 910, the watercraft or aircraft receives the random code. In aspects, the portable electronic device 910 may encrypt the random code and transmit at step 930 the encrypt code to the watercraft or aircraft by using a short-range communication method, such as NFC, BLE, ZigBee, IR, or RFID. In this short-range communication method, E2EE is used to ensure protection.

The watercraft or aircraft also receives the random code from the server at step 925. The watercraft or aircraft deciphers the received encrypted code and determines whether the deciphered code matches the code saved therein. When it is determined that the deciphered code does not match at step 960, the portable electronic device 910 is caused to display "INVALID" on its screen so that the watercraft or aircraft cannot be controlled by the user at step 970.

In case when it is determined that the deciphered code matches the stored code at step 940, the engine of the watercraft or aircraft can be powered and activated by the user of the portable electronic device 910 so that the user is able to control the watercraft or aircraft at step 950.

The server may store all activities including controls of the watercraft or aircraft and results of random code inputs whether or not valid or invalid in a hyper ledger using blockchain technology. Further, the user may access the hyper ledger through a valid random code and check all activities related to the portable electronic device 910 and the watercraft or aircraft.

Figure 10:
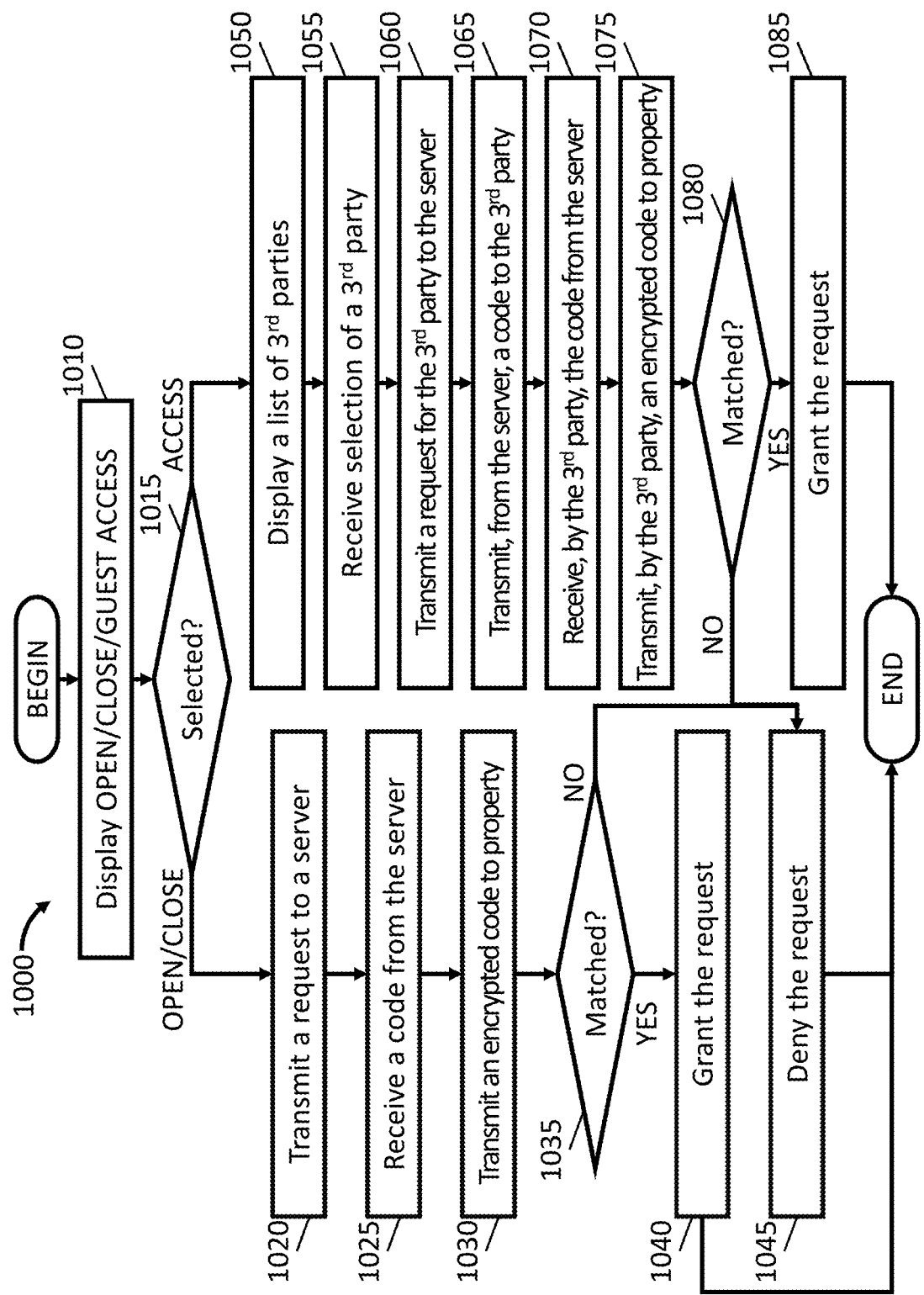
FIG. 10 is a flow chart illustrating a method for granting/denying an access to a property in accordance with embodiments of the present disclosure.

FIG. 10 is a flowchart illustrating a method for granting/denying entry to property in accordance with embodiments of the disclosure. The method 1000 may be stored in memory as computer-executable instructions. The method 1000 may perform all or a portion of its steps when a computer or processor execute the stored computer-executable instructions. In this way, the method 1000 may be implemented by any electronic gadget, which includes a processor and a storage medium.

The method 1000 starts by displaying selectable buttons or options on a screen of a smart device at block 1010. The buttons may include OPEN, CLOSE, GUEST ACCESS. OPEN and CLOSE are for opening and closing a door of a property, and GUEST ACCESS is for allowing one or more third parties an entry to the property.

At block 1015, it is determined which option is selected. In case OPEN or CLOSE is determined to be selected, the smart device transmits to a server a request for opening or closing the entry to the property at block 1020. In aspects, the entry may mean starting an engine for moving vehicles such as cars, hovers, aircrafts, and watercrafts. In another aspect, the entry may mean actual entry to immovable buildings via a door thereof, such as financial institutions, business establishments, individual residents, and safes.

The request may include information of the smart device, such as a name, physical address, email address, IP address, phone number, or MAC address of the smart device. Further, the selected button may be included in the request.

The smart device may employ a wireless communication method through Internet, which may be Wi-Fi, 2G-5G GSM, TDMA, CDMA, LTE, Bluetooth, or any other communication method used for a long-distance communication.

The server randomly generates a code upon reception of the request and at block 1030, transmits the random code to the smart device via the same communication method. The size or length of the random code may be shorter or longer than or equal to 32 bytes depending on the required level of security of the property. The server may transmit the random code to the property at block 1030.

The smart device encrypted the random code and transmits the encrypted code to the property at block 1035. The communication method employed between the smart device and the property may be a short-range communication method, such as NFC, BLE, ZigBee, IR, or RFID. The short-range communication method is different from the communication method used between the smart device and the server. In this short-range communication method, the E2EE is used to ensure protective measures. E2EE may cause the smart device to encrypt the random code in transmission. The E2EE may utilize a public key system so that only the smart device and the property can decipher the encrypted code and no other eavesdroppers can decipher the encrypted code.

At block 1035, it is determined whether or not the deciphered code matches the code stored in the property. In case when it is determined that the deciphered code matches the stored code, the request is granted at block 1040 so that the user of the smart device can enter into or exit from the property. If not, the request is denied at block 1045 so that the user is not allowed to enter into or exit from the property. This concludes the selection of OPEN or CLOSE in the options displayed on the smart device.

Now, referring back to step 1015, when it is determined that GUEST ACCESS is selected, the user of the smart device is able to allow one or more third parties to open or close the entry to the property. The smart device displays a list of third parties, which have been previously added to the list at block 1050. When the user selects one or more third parties, a corresponding status, which may be GRANT or DENY, may be selected for each of the one or more third parties. The status of DENY may be selected to prevent a third party from opening or closing the door of the property.

The smart device receives selection of one or more third parties by the user of the smart device at block 1055. At block 1060, the smart device transmits a request with the selection of one or more third parties. The selection may include the selected status for each of the selected third parties. In aspects, the selection may further include information of the smart device of each selected third party, such as a name, physical address, email address, IP address, phone number, or MAC address.

At block 1065, the server generates a random code and transmits the random code to each of the selected third parties based on the information of the selected third parties. The server sends the random code to the property, which then saves the random code for a later checkup. At block 1070, the smart device of each selected third party receives the random code.

The smart device of each selected third party encrypts the random code and transmits the encrypted code to the property at block 1075. The encryption may be performed while transmitting the random code by using the E2EE.

The property deciphers the encrypted code and at block 1080, the property determines whether or not the deciphered code matches the code saved in the property. When it is determined that the deciphered code does not match the stored code, the request is denied at block 1045.

When it is determined that the deciphered code match the stored code, the request for opening or closing an entry to the property is granted to the selected third party at block 1040.

In aspects, after blocks 1040, 1045, and 1085, the result of grant or deny of the request is recorded as an access history log. The server may generate a block using blockchain technology and save the block in a hyper ledger, which is then saved in a plurality of servers. The hyper ledger may be accessed and searched by the smart device receiving the random code from the server.

Figure 11:
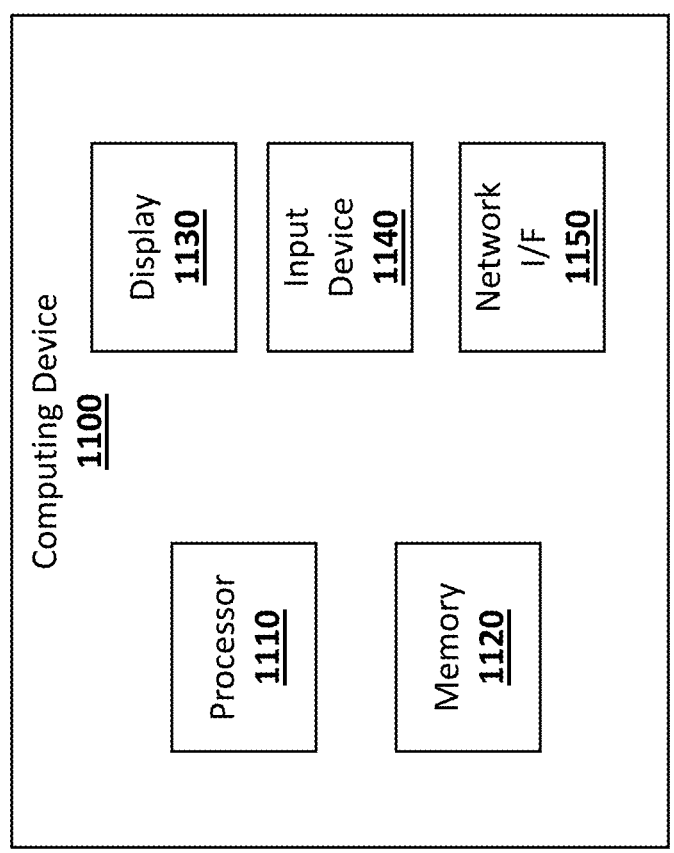
FIG. 11 is a block diagram of a computing device used in the e-key system of FIG. 1 in accordance with embodiments of this disclosure.

FIG. 11 shows a block diagram of a computing device 1100 representing the smart device 120 or the servers 130a-130n of FIG. 1 in accordance with embodiments of this disclosure. The computing device 1100 may be the portable electronic device 910 of FIG. 9. The computing device 1100 includes processor 1110, memory 1120, display 1130, input device 1140, and/or network interface 1150. The memory 1120 may store one or more applications and data.

The memory 1120 may include any non-transitory computer-readable storage media for storing data and/or software that is executable by the processor 1110 and which controls the operation of the computing device 1100. In aspects, the memory 1120 may include one or more solid-state storage devices such as flash memory chips. Alternatively, or in addition to the one or more solid-state storage devices, the memory 1120 may include one or more mass storage devices connected to the processor 1110 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 1110. That is, computer readable storage media may include non-transitory, volatile and non-volatile, removable and non-removable media implemented in any method or technology for storage of information such as computer-readable instructions, data structures, program modules or other data. For example, computer-readable storage media may include random access memory (RAM), read-only memory (ROM), erasable programmable ROM (EPROM), electrically erasable programmable ROM (EEPROM), flash memory or other solid state memory technology, CD-ROM, DVD, Blu-Ray or other optical storage, magnetic cassettes, magnetic tape, magnetic disk storage or other magnetic storage devices, or any other medium which may be used to store the desired information and which may be accessed by the computing device 1100.

The memory 1120 further includes an operating system (OS) configured to control basic input/output functions and the OS file system. Those skilled in the art will recognize that suitable operating systems include, by way of non-limiting examples, FreeBSD, OpenBSD, NetBSD®, Linux, Apple® Mac OS X Server®, Oracle® Solaris®, Windows Server®, and Novell® NetWare®. Those skilled in the art will also recognize that suitable personal computer operating systems or mobile operating systems include, by way of non-limiting examples, Microsoft® Windows®, Apple® Mac OS X®, UNIX®, and UNIX-like operating systems such as GNU/Linux®. In some embodiments, the OS is provided by cloud computing. Those skilled in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

The display 1130 may include a cathode ray tube (CRT), liquid crystal display (LCD), light-emitting diode (LED), or any other forms of display. The display may be touch-sensitive and can be used as an input device.

The network interface 1150 may be configured to connect to a network such as a local area network (LAN) consisting of a wired network and/or a wireless network, a wide area network (WAN), a wireless mobile network, a Bluetooth network, and/or the Internet. The input device 1140 may be any device by means of which a user may interact with the computing device 1100, such as, for example, a mouse, keyboard, foot pedal, touch screen, and/or voice interface.

Key Fob System

Figure 12A:
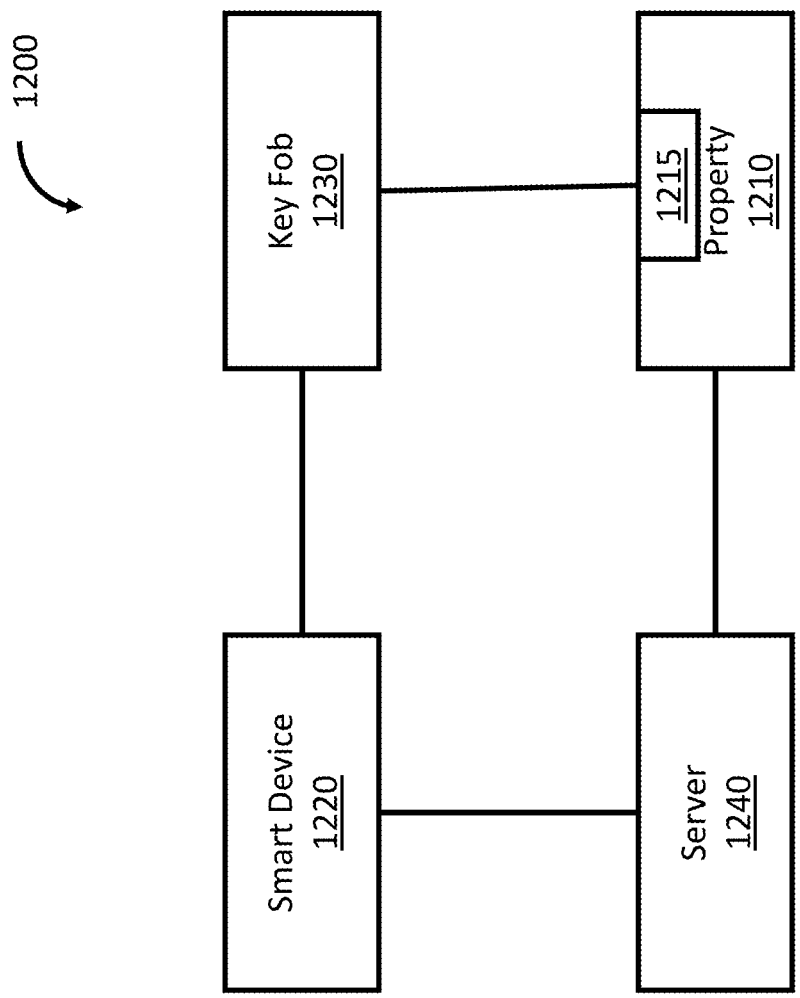
FIG. 12A is a block diagram of an example key fob system in accordance with embodiments of this disclosure.
Figure 12B:
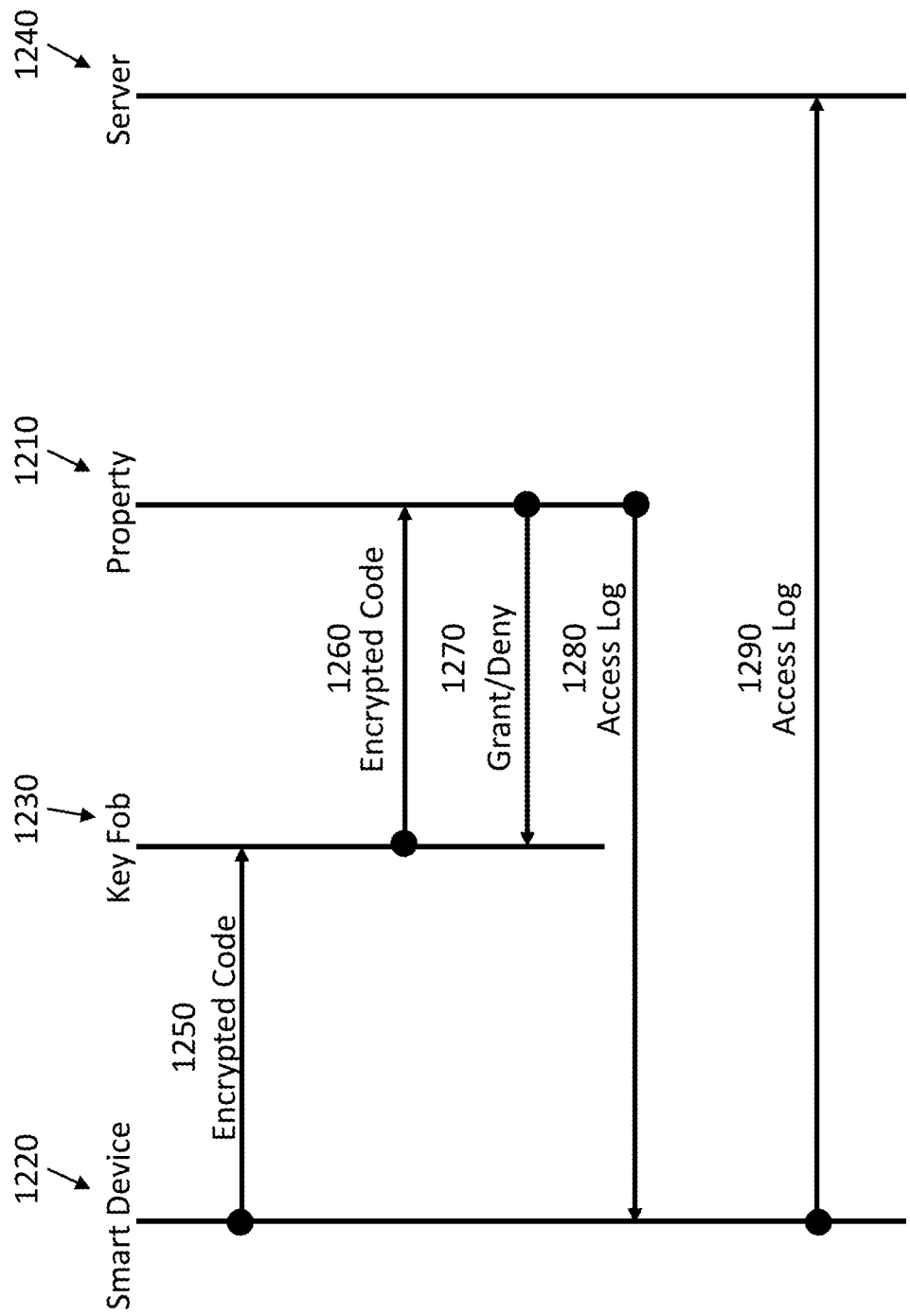
FIG. 12B is a sequence diagram illustrating a communication procedure for a key fob system in accordance with embodiments of this disclosure.

FIG. 12A shows a key fob system 1200 and FIG. 12B shows an information flow diagram in the key fob system 1200 according to embodiments of present disclosure. The key fob system 1200 includes a property 1210, a smart device 1220, a key fob 1230, and a server 1240, of which all are connected through a network. The key fob system 1200 wirelessly grants an access to the property 1210 upon reception of an encrypted code from the key fob 1230. The entry 1215 may be a door, an engine, or a lock. For example, when the property 1210 is a land vehicle, the entry 1215 may be a door to get into the land vehicle or an engine to be started; when the property 1210 is an aircraft or watercraft, the entry 1215 may be a door of the aircraft or watercraft or an engine to be started so that a user can control the aircraft or watercraft; or when the property 1210 is a building or a safe, the entry 1215 may be a door or lock to the building or the safe, respectively. The above lists of the property 1210 and the entry 1215 are not intended to be limited thereto but to provide examples.

The smart device 1220 works as a control device in the key fob system 1200. The smart device 1220 may be a smartphone, tablet, phablet, computer, or mobile device, which is capable of communicating with the key fob 1230 and the server 1240 via different communication methods. For example, the smart device 1220 may communicate with the server 1240 through internet wirelessly or wired, and with the key fob 1230 through Bluetooth.

The key fob 1230 may include one or more buttons, which can be used to access the property 1210. In an aspect, the key fob 1230 may include one button for sending an encrypted code to the property 1210 for receiving access to the property 1210. In another aspect, the key fob 1230 may include several buttons, each of which is designated to a corresponding function of the property 1210. For example, one button is to start an engine in a case where the property 1210 is a land vehicle, watercraft, aircraft, or a military vehicle.

The key fob 1230 may be preprogrammed to be paired with the property 1210 so that the key fob 1230 may communicate with the property 1210 via Bluetooth communication. Thus, no Internet connection is necessary in the communication between the property 1210 and the key fob 1230. Further, the smart device 1220 may be configured to be paired with the key fob 1230 via Bluetooth communication. Thus, no Internet connection is needed in the communication between the key fob 1230 and the smart device 1220.

The server 1240 may store the access history of the key fob 1230 in the property 1210 in a hyper ledger. Thus, the server 1240 may utilize blockchain technology to generate blocks for storing the access history and save the block in the hyper ledger stored in the servers 130a-n of FIG. 1 described above.

Returning to FIG. 12B, the smart device 1220 generates an encrypted code, which works as an authorized key to the entry 1215 of the property 1210. The smart device 1220 may transmit the generated encrypted code to the key fob 1230 at step 1250. In an aspect, the smart device 1220 and the key fob 1230 may communicate with each other according to the Bluetooth protocol. In embodiments, the smart device 1220 and the key fob 1230 may be paired via any suitable communication protocol. Accordingly, any nearby electronic gadgets cannot hack or hijack the encrypted code transmitted from the smart device 1220 to the key fob 1230. The communication method used between the smart device 1220 and the key fob 1230 may use any other suitable communication protocol, which ensures that communications are only between the paired devices.

At step 1260, the key fob 1230 may transmit the received encrypted code to the property 1210. The key fob 1230 may utilize Bluetooth in transmitting the encrypted code. Since Bluetooth communication is allowed between the paired devices, the encrypted code is not likely to be exposed to hacking or hijacking. In embodiments, the smart device 1220 may transmit the encrypted code to the key fob constantly, sporadically, at regular intervals, or upon request by the key fob 1230. In some embodiments, the key fob 1230 may change from being paired with the smart device 1220 to being paired with the computing device of the property 1210 in a case where both the smart device 1220 and the property 1210 are within communication range.

In an aspect, the smart device 1220 may encrypt the code by using an E2EE. For example, public and private keys may be used in encryption. As such, the smart device 1220 may encrypt the code with the public key and the property 1210 may decrypt the received code from the key fob 1230 with the private key. In this way, the E2EE may add security to the Bluetooth communication.

After decryption, the property 1210 may determine whether the received code from the key fob 1230 is valid. Based on this determination, the property 1210 may grant or deny the key fob 1230 an access to the property 1210 at step 1270. Further, the property 1210 transmits the result of grant/deny, as an access log, to the smart device 1220 at step 1280. Furthermore, the property 1210 may transmit any activities via the key fob 1230 in the access log to the smart device 1220 at step 1280.

In an aspect, the property 1210 may include a validation module which performs the determination of validity of the encrypted code. The validation module may be trained by an artificial intelligence (AI) or machine learning.

When the smart device 1220 establishes a connection with the server 1240, the smart device 1220 may relay the access log to the server 1240 at step 1290. In turn, the server 1240 generates a block to save the access log therein and saves the block in a hyper ledger.

In an aspect, the smart device 1220 may transmit the encrypted code to the property 1210 directly at step 1250. In response, the property 1210 may grant and deny an access to the property 1210 to the smart device 1220.

Figure 13:
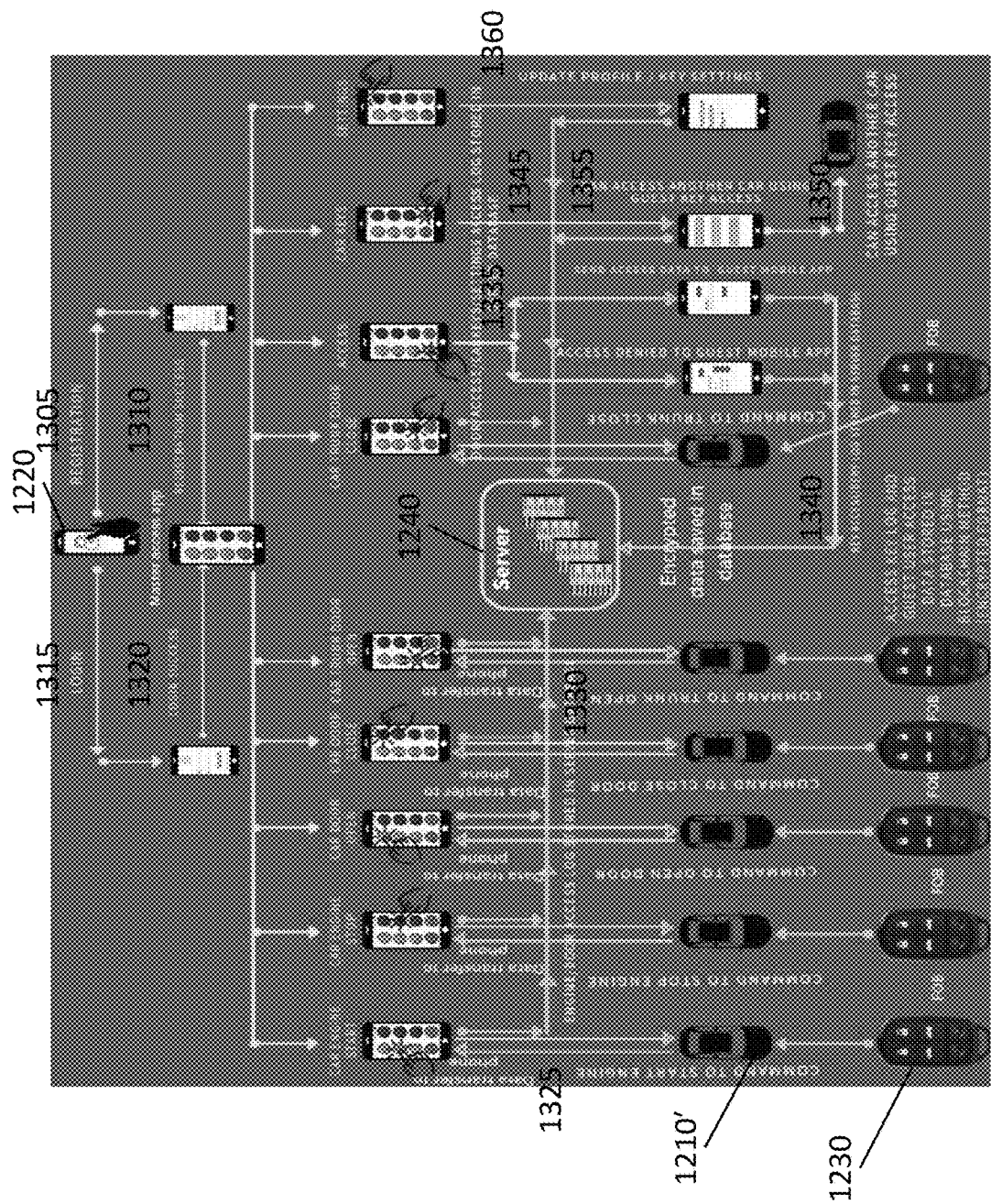
FIG. 13 is a flow diagram illustrating the operation of the example key fob system of FIG. 12A in accordance with embodiments of this disclosure.

The key fob system 1200 may allow a third party to access the property 1210. FIG. 13 illustrate an embodiment of the key fob system 1200, in which the smart device 1220 may be used to share an access to the vehicle 1210'. As illustrated in FIG. 13, the vehicle 1210' is a vehicle but can be other types of property, such as an aircraft, watercraft, land vehicle, military vessel, building, room, etc. When the user of the smart device 1220 installs a mobile application thereon, the user has to register to the smart device 1220 at step 1305. When the registration is succeeded, the smart device 1220 informs the user of the registration at step 1310.

When the user opens the mobile application and provides login information to the mobile application at step 1315. If the login information is correct, the user may be able to login to the mobile application at step 1320. One or more menus are then displayed on the screen of the smart device 1220. Based on the user's selection, different functions may be performed at step 1325.

The list of menus may include start/stop engine, open/close door, open/close trunk, car key, and settings. This list of menus may be expanded or reduced according to functionalities of the property 1210. When the start engine is selected, the smart device 1220 may transmit the command to the property 1210, and when the command is valid, the vehicle 1210' starts its engine. When stop engine is selected and the command received from the smart device 1220 is valid, the vehicle 1210' ends the engine.

In a similar way, when open/close door or open/close trunk is selected and the command received from the smart device 1220 is valid, the corresponding car door or trunk door may be opened or closed. Successes and failures of these activities are saved in the smart device 1220, which may be transmitted to the server 1240 when a network connection is established between the smart device 1220 and the server 1240 at step 1330.

In an aspect, the command may include two parts: a code and a selected function. The two parts are encrypted by the smart device 1220 and the encrypted parts are to be transmitted to the vehicle 1210'. The vehicle 1210' then decrypts the encrypted parts and checks whether the decrypted code is valid. When the code is validated, the vehicle 1210' performs the selected function.

In another aspect, the encryption and decryption may be performed with a private and public key. Further, the communication between the smart device 1220 and the vehicle 1210' may be secured in the paired devices, such as Bluetooth.

In an aspect, the smart device 1220 may transmit the command to the vehicle 1210' via the key fob 1230. That is, the smart device 1220 may transmit the encrypted code to the key fob 1230. When the user of the key fob 1230 presses one of the buttons of the key fob 1230, the key fob 1230 may add the function, corresponding to the selected button, to the encrypted code and transmit to the vehicle 1210'. For example, the key fob 1230 may have several buttons including a first one for a car door, a second one for a car engine, a third one for a trunk door, etc. The button for the car door may be used to open or close the car door, meaning that each press of the button toggles the opening or closing the car door. In a further aspect, the key fob 1230 may include two buttons for the car door, meaning that one button is for opening the car door and the other button is for closing the car door.

When the user selects a button of the key fob 1230, the key fob 1230 may combine the encrypted code received from the smart device 1220 and the function associated with the selected button. In an aspect, the key fob 1230 may decrypt the encrypted code received from the smart device 1220, combine and encrypt the decrypted code with the selected function to generate a command, and transmit the command to the vehicle 1210'. Upon reception of the command, the vehicle 1210' may decrypt the command, separate the code and the selected function from the decrypted command, and validate the code. When the code is not valid, the selected function cannot be performed by the vehicle 1210'.

In another aspect, the key fob 1230 may combine the encrypted code, which has not gone through decryption, with the selected function to generate a command, and transmit the command to the vehicle 1210'. In this case, the vehicle 1210' may decrypt only the encrypted code and validate the code.

When the user selects the access button on the screen of the smart device 1220 at step 1335, the user is able to grant or deny a third party an access to the vehicle 1210'. The mobile application may provide a list of third parties to the user who can select one or more from the list of third parties to grant/deny the access to the vehicle 1210'.

At step 1340, the user's selection of third parties and grant/deny is sent to the server 1240 so that the user's selection is saved in the hyper ledger of the server 1240. In an aspect, the smart device 1220 may also send to the server 1240 the encrypted code or the public key used in encrypting the code.

When the user grants a third party an access to the vehicle 1210', the third party may be able to select one of the car key buttons displayed on a smart device of the third party at step 1345. The smart device of the third party may communicate with the server 1240 so as to receive the encrypted code or the public key for encryption from the server 1240. In an aspect, when the user of the smart device 1220 selects the grant button, the smart device 1220 may transmit the encrypted code to the smart device of the selected third party. In another aspect, the smart device of the selected third party may receive a guest access code, which can be validated by the vehicle 1210'.

In still another aspect, the selected third party may receive an updated access key whenever there are new attempts to access the vehicle 1210' by the selected third party. The access ability of the selected third party may be maintained until the user of the smart device 1220 denies the access of the selected third party or until the access key for the selected third party expires. In this regard, the access key may be valid for a period that the user of the smart device 1220 has set.

The key fob 1230 has been pre-programmed only to access the vehicle 1210'. Thus, a key fob of the selected third party may not be used to access the vehicle 1210' and the selected third party can only use his/her smart device to access the vehicle 1210'.

At step 1350, the smart device of the selected third party transmits the command including the encrypted code or the guest access code to the vehicle 1210' and the selected third party can access the vehicle 1210' after the command is validated. The smart device of the selected third party may send the access log to the server 1240 at step 1355 so that the access log may be saved in the hyper ledger.

When the user of the smart device 1220 selects the settings button at step 1360, the user is able to change, update, or modify the current settings, personal information, information about the vehicle 1210' which is paired with the smart device 1220 in Bluetooth communication, information about the key fob 1230 which is paired with the smart device 1220 in Bluetooth communication, or other settings. Such changes, modifications, or updates may be transmitted to the server 1240 at step 1355 so that they may be saved in the hyper ledger.

When an unauthorized access is identified, the server 1240 may provide an alert to the user of the smart device 1220 via text message, email, telephone call, social networking service (SNS) message, audio alert, flash light, etc. so that the user can take a proper course of action.

In another aspect, due to usage of the Bluetooth communication, the smart device 1220, the vehicle 1210', and the key fob 1230 can communicate with each other even in the absence of internet connection. The smart device 1220 may need an internet connection to save the access log or history in the hyper ledger of the server 1240.

Satellite Communication Systems

Figure 14:
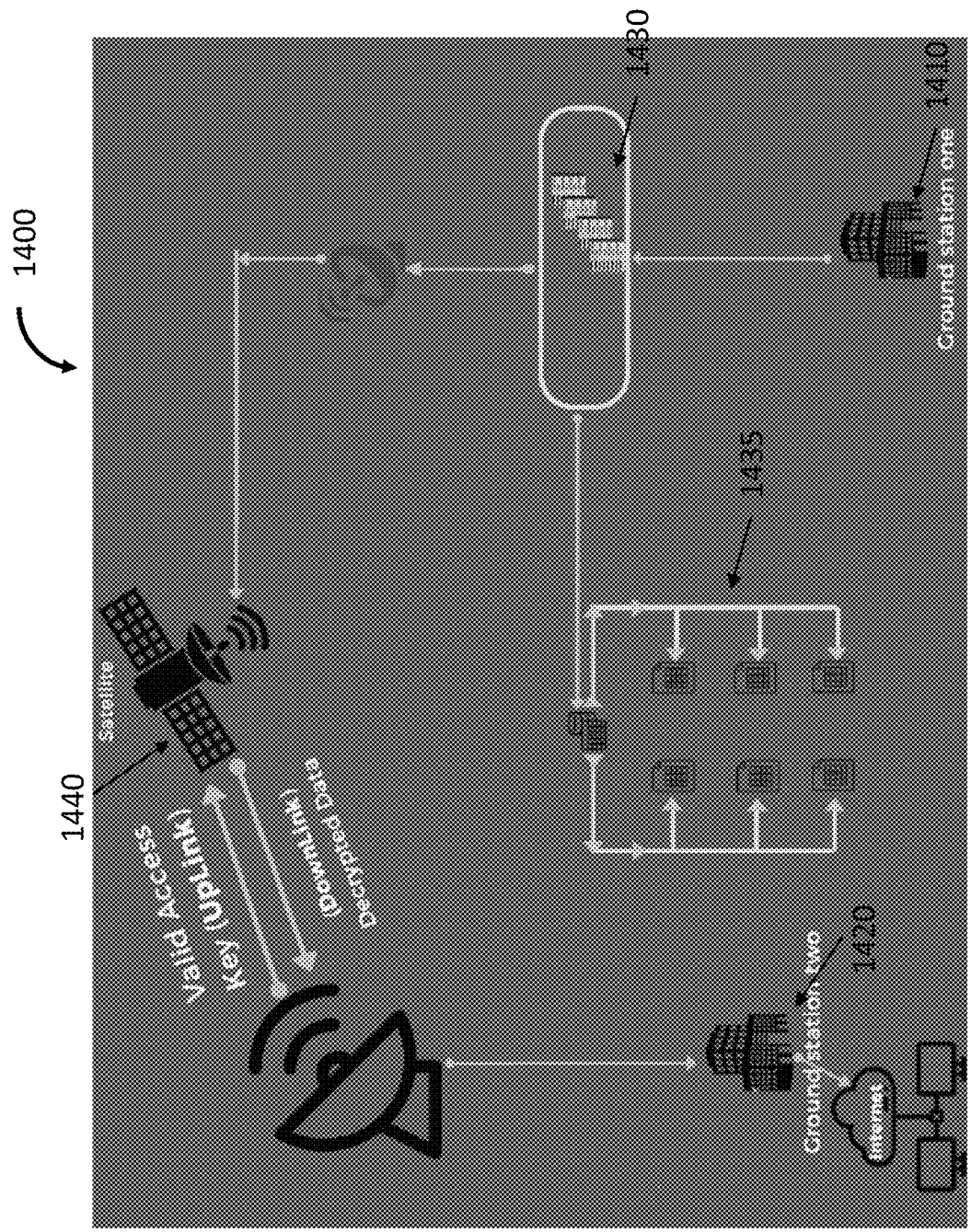
FIG. 14 is a block diagram illustrating a satellite communication system using blockchain in accordance with embodiments of this disclosure.
Figure 15:
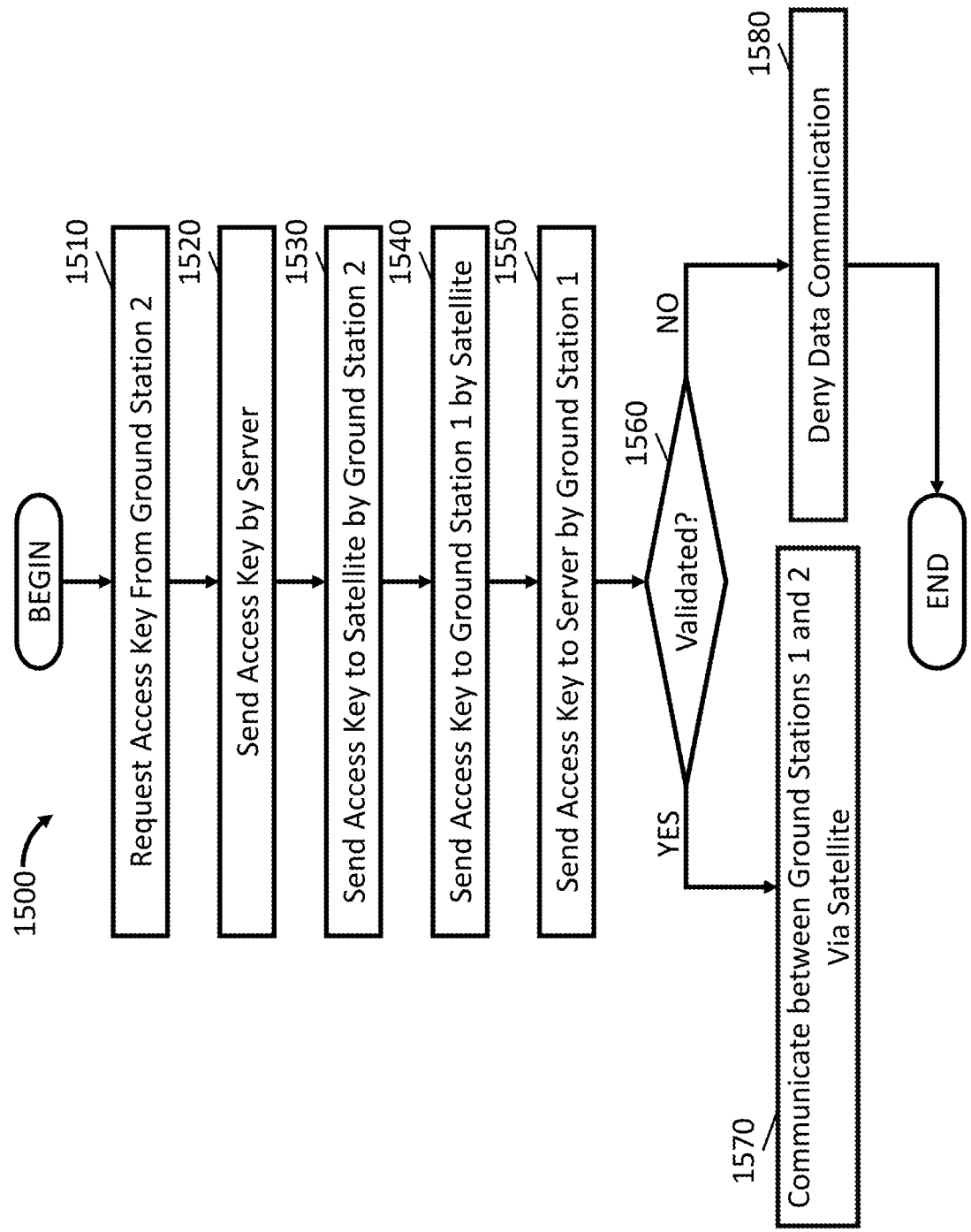
FIG. 15 is a flow chart illustrating a method for permitting/denying data communication via a satellite in accordance with embodiments of this disclosure.

Provided in FIG. 14 is a satellite communication system 1400, which employs blockchain technology to secure communication data and FIG. 15 shows a flowchart illustrating a satellite communication method 1500 for the satellite communication system 1400 of FIG. 14 in accordance with embodiments of this disclosure. The satellite communication system 1400 may allow data communication via a satellite after validating an access key. Thus, when the access key is not validated, data communication via the satellite is denied and the data communication is not initiated.

The satellite communication system 1400 may include a first station 1410, a second station 1420, and servers 1430. The first station 1410 may communicate with the second station 1420 via the servers 1430 and the satellite 1440. Validation results of the access key are saved in a server of the servers 1430. Further, the server of the servers 1430 may encrypt the data in the communication and save the encrypted data in a hyper ledger 1435. The first station 1410 and the second station 1420 may include any computer, smart device, tablet, phablet, mobile device, server, or data center, which are capable of communicating with each other.

When data is needed by the second station 1420, e.g., to access an item of property, the second station 1420 transmits a request for an access code to the one or more servers 1430 via the satellite 1440 at block 1510. Specifically, the second station 1420 transmits the request for an access code by uploading the request through the uplink to the satellite 1440, which then relays the request to the one or more servers 1430. In an aspect, the first station 1410 may request that the one or more servers 1430 transmit an access key to the first station 1410 at block 1510, in a case when the first station 1410 transmits data to the second station 1420 or instruct the second station 1420 to do some tasks.

Upon receipt of the request, the one or more servers 1430 generate and transmit an access key to the second station 1420 at block 1520. The second station 1420 and one of the servers 1430 may communicate with each other by using an end-to-end encryption (E2EE) method with private and public keys. This ensures that the communication between the second station 1420 and one or more of the servers 1430 is secure. To transmit data, which includes the request or the access key, satellite dishes may be used between the second station 1420 and the satellite 1440 and between the one or more servers 1430 and the satellite 1440. Other communication systems and apparatuses may additionally or alternatively be utilized as is readily appreciated by a person having ordinary skill in the art.

At block 1530, the second station 1420 transmits the received access key to the satellite 1440 and, in turn, the satellite 1440 sends the access key to the first station 1410 at block 1540. After receiving the access key, the first station 1410 sends the received access key to the one or more servers 1430 for validation at block 1550.

At block 1560, the one or more servers 1430 determine whether or not the received access key from the first station 1410 matches the access key which the one or more servers 1430 sent to the second station 1420. When it is determined that the access keys match each other, the one or more servers 1430 validate the received access key and inform the first station 1410 of the validation. The first station 1410 then permits communication with the second station 1420. At block 1570, the first station 1410 and the second station 1420 start communicating with each other via the satellite 1440.

In a case when the one or more servers 1430 determine that the received access key does not match the access key which the one or more servers 1430 transmitted to the second station 1420 at block 1560, the one or more servers 1430 inform the first station 1410 that the received access key is not valid. At block 1580, the first station 1410 denies any communication with the second station 1420 with the received access key. When the second station 1420 is a valid station for communication, the second station 1420 may make another attempt to receive another access code from the one or more servers 1430. Then, the satellite communication method 1500 repeats steps 1510-1580.

In the cases of validation and non-validation cases, the one or more servers 1430 create a block for such determinations and save the block in the hyper ledger.

In an aspect, when the same station continuously transmits an erroneous access key, the one or more servers 1430 may make a black list, which includes that station. The one or more servers 1430 may monitor the stations and may assign a status level to the stations based on the behavior of the stations. For example, when the one or more servers 1430 determine that the behavior of a station exceeds a threshold value, the one or more servers 1430 may change the status of the station from good to bad and/or may prevent the station from accessing the one or more servers 1430 until the station can provide further verification information. For example, when a station (e.g., the first station) unsuccessfully attempts to obtain one or more access keys a predetermined number of consecutive or total times (e.g., three times or five times), the one or more servers 1430 recognize the station as a bad station and informs the station of its updated status.

In another aspect, the access key may be valid for a predetermined period so that the second station 1420 may communicate with the first station 1410 during the predetermined period, but cannot do so after the predetermined period elapses. This may prevent a station operator having ill purposes (e.g., a hacker or a hijacker) from attempting to obtain valid access in the future.

In a further aspect, the one or more servers 1430 may encrypt data, which is communicated between the first station 1410 and the second station 1420 via the satellite 1440. Particularly, when the first station 1410 transmits data to the second station 1420, the data may be transmitted to the one or more servers 1430 first. The one or more servers 1430 then encrypt the data and save the encrypted data in the hyper ledger. Further, the one or more servers 1430 sends the encrypted data to the second station 1420 via the satellite 1440. The data saved in blocks of the hyper ledger may be reference data, which is used to check whether the data has been hacked, modified, tempered, or removed.

In an aspect, each block may include a set amount of data, such as 1 mega bites (MB), 10 MB, 100 MB, or any size suitable for communication purposes between the first station 1410 and the second station 1420. To save storage space, the one or more servers 1430 may not create a block periodically. Rather, the one or more servers 1430 may create a block whenever communication between the first station 1410 and the second station 1420 occurs. Further, the one or more servers 1430 may not store the data communicated via the satellite 1440 to save storage space. Instead, the first station 1410 may encrypt the data before transmitting to the second station 1420 via the satellite 1440 by using an E2EE with public and private keys.

In another aspect, the satellite 1440 may prohibit any communication initiated from the second station 1420, when the one or more servers 1430 inform of non-validation of the access code. In particular, the satellite 1440 may deny any data communication transmitted by the second station 1420 via the uplink. Thus, any further attempts by the second station 1420 cannot reach the first station 1410. At the same time, the satellite 1440 may allow any data communication transmitted by the first station 1410 to the second station 1420. That is any data communication through downlink to the second station 1420 is not denied. In this way, even if the access key from the second station 1420 is not validated, the first station 1410 may be able to send data to the second station 1420 via the satellite 1440. Nevertheless, the first station 1410 cannot receive any data from the second station 1420 when the access key is not validated.

Figure 16:
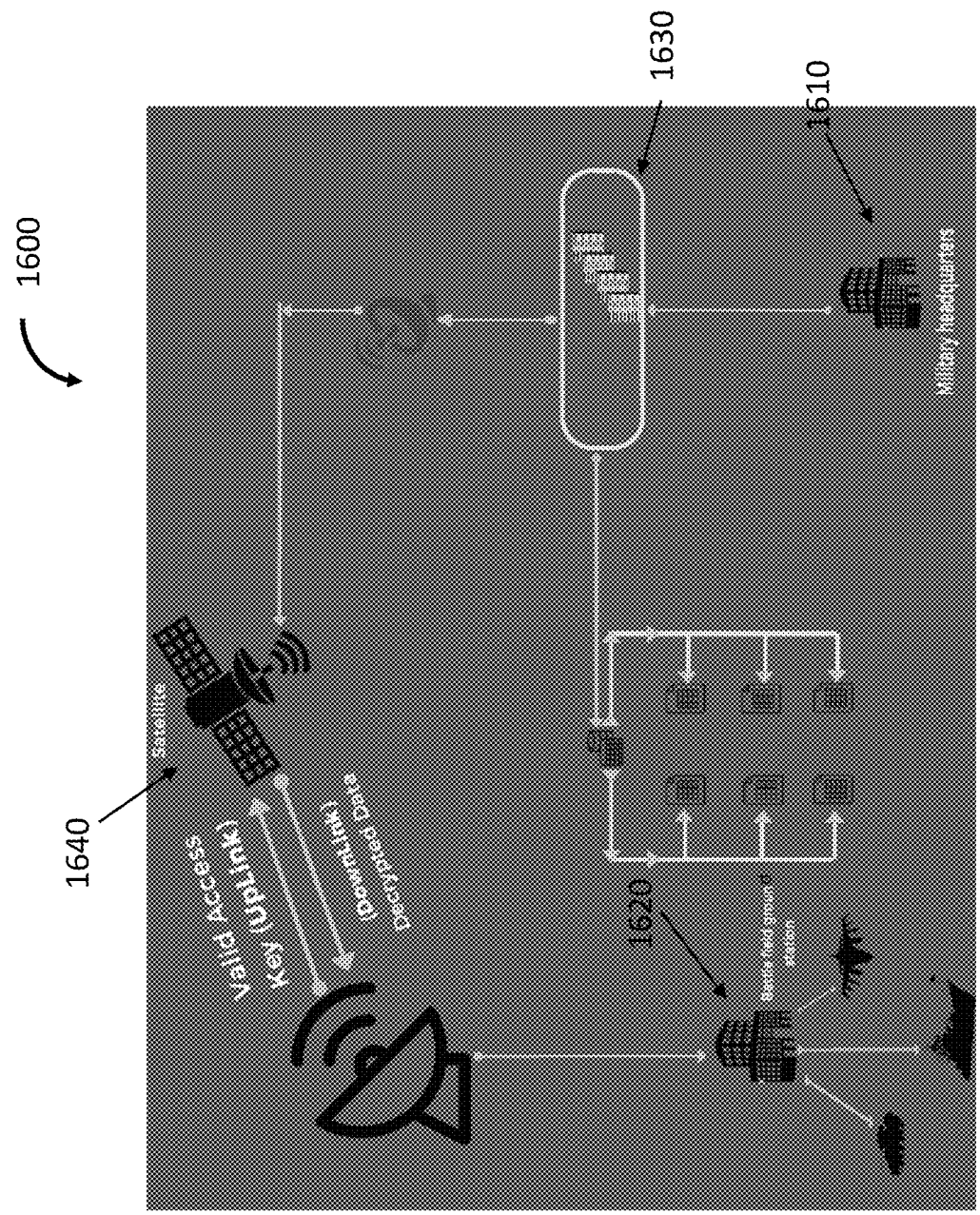
FIG. 16 is a block diagram illustrating a military communication system using satellite and blockchain in accordance with embodiments of this disclosure.

Now referring to FIG. 16, provided is a military system 1600 using the satellite communication system 1400 of FIG. 14 in accordance with embodiments of this disclosure. In this embodiment, the first station 1410 of FIG. 14 is a military headquarter 1610, the second station 1420 of FIG. 14 is a battle field station 1620. In the same way as the first station 1410 communicates with the second station 1420, the battle field station 1620 communicates with the military headquarter 1610 by using an access key obtained from and validated by the server 1630. Thus, detailed descriptions regarding communication and validation between the military headquarter 1610 and the battle field station 1620 can be found in the above descriptions of FIG. 14.

When the battle field station 1620 receives data or instructions from the military headquarter 1610 via the satellite 1640, the battle field station 1620 may relay the data or instructions to military aircrafts, military marine ships, or military vehicles. As the data or instructions from the military headquarter 1610 are encrypted, the battle field station 1620 may decrypt the received data or instructions and perform any task according to the data or instructions.

By using the blockchain or hyper ledger, all access history or communicated data can be securely saved and retrieved later as reference data for confirmation and validation. Due to the high security level inherently required in military communications, communication between the battle field station 1620 and the military headquarters 1610 may be encrypted using E2EE, which may be different from the encryption protocol used between the military headquarter 1610 and the battle field station 1620.

Any data returning to the battle field station 1620 from the military vehicles may be transmitted to the military headquarters 1610 and in turn saved in the hyper ledger of the server 1630.

Now returning back to FIG. 14, the first station 1410 and the second station 1420 may be any servers of a business entity or private entity. For example, the first station 1410 and the second station 1420 may be research servers for sociology, biology, electrical engineering, material science, cosmology, astronomy, or any other areas of science or knowledge-based study. Alternatively, the first station 1410 and the second station 1420 may be any servers used for business purposes, such as financial transactions, stock trading, email communications, etc. In an aspect, the first station 1410 and the second station 1420 may be any personal computers, mobile devices, tablets, or any personal computing device used for communication via the satellite 1440.

Access key may be utilized in any communications between two parties, stations, computers, servers, any combination thereof with blockchain technology so that data communication is secured and hacking and hijacking may be prevented with substantially high assurance and certainty. Application of the combination of the access key and blockchain may be used in other areas as readily appreciated by a people having ordinary skill in the art.

Applications of the Satellite Communication System

Figure 17:
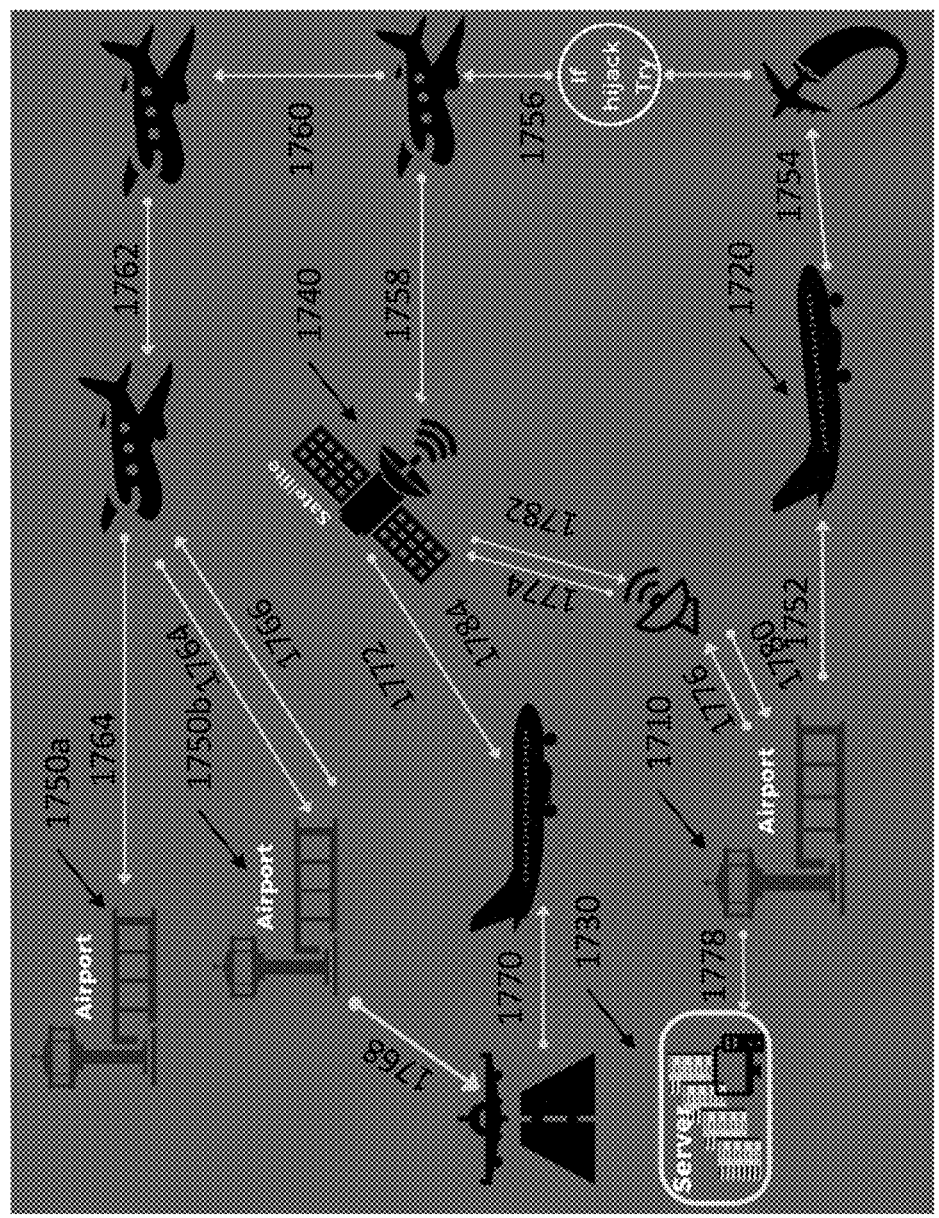
FIG. 17 is a block diagram illustrating an application of the satellite communication system of FIG. 14 to the aviation industry in accordance with embodiments of this disclosure.

Provided in FIG. 17 is an application of the satellite communication system 1400 of FIG. 14 to the aviation industry in accordance with embodiments of this disclosure. An airport 1710, an airplane 1720, and a server 1730 correspond to the first station 1410, the second station 1420, and the one or more servers 1430 of FIG. 14, respectively. The airplane 1720 receives an access key from the server 1730 at step 1752 when the airplane 1720 is scheduled to fly to a destination. The access key may be valid for the entire flight.

The airplane 1720 takes off from the airport 1710 at step 1754 and encounters a potential hijacker at step 1756. In this case, the airplane 1720 may send an alert signal to the satellite 1740 using E2EE at step 1758 and may change the flight mode from manual to automatic at step 1760. Due to the imminent danger, the airplane 1720 may automatically lock the doors at step 1760. Since the alert signal is encrypted, the potential hijacker may not be able to listen to the encrypted alert signal.

The satellite 1740 may transmit the alert signal to the airport 1710 and the airport 1710 may also transmit the alert signal to the server 1730 so as to save the alert signal in the hyper ledger.

At step 1762, the airplane 1720 may search for nearby airports (e.g., airports 1750a and 1750b) for emergency landing and may send a request for landing to the airports 1750a and 1750b at step 1764. If the airport 1750a rejects the request but the airport 1750b accepts the request, the airport 1750b transmits the acceptance to the airplane 1720 at step 1766.

The airplane 1720 is guided to land at step 1768 and lands on an airstrip of the airport 1750b at step 1770. Due to the emergency lock on the doors, passengers in the airplane 1720 cannot escape from the airplane 1720 at this time.

When landing is complete, the airplane 1720 may inform the airport 1710 of the landing via the satellite 1740 at steps 1772-1776. The airport 1710 may generate and encrypt an unlock code, and send it to the airplane 1720 via the satellite 1740 at steps 1780-1784.

Upon reception of the encrypted unlock code, the airplane 1720 may decrypt the encrypted unlock code and unlock the doors of the airplane 1720. In this application, the server 1730 may save all history including the potential hijacking event, emergency signal, unlock code, and any related events in the hyper ledger. Thus, by using the hyper ledger based on the blockchain, data security in the aviation industry is increased while hijacking risks are decreased.

Figure 18:
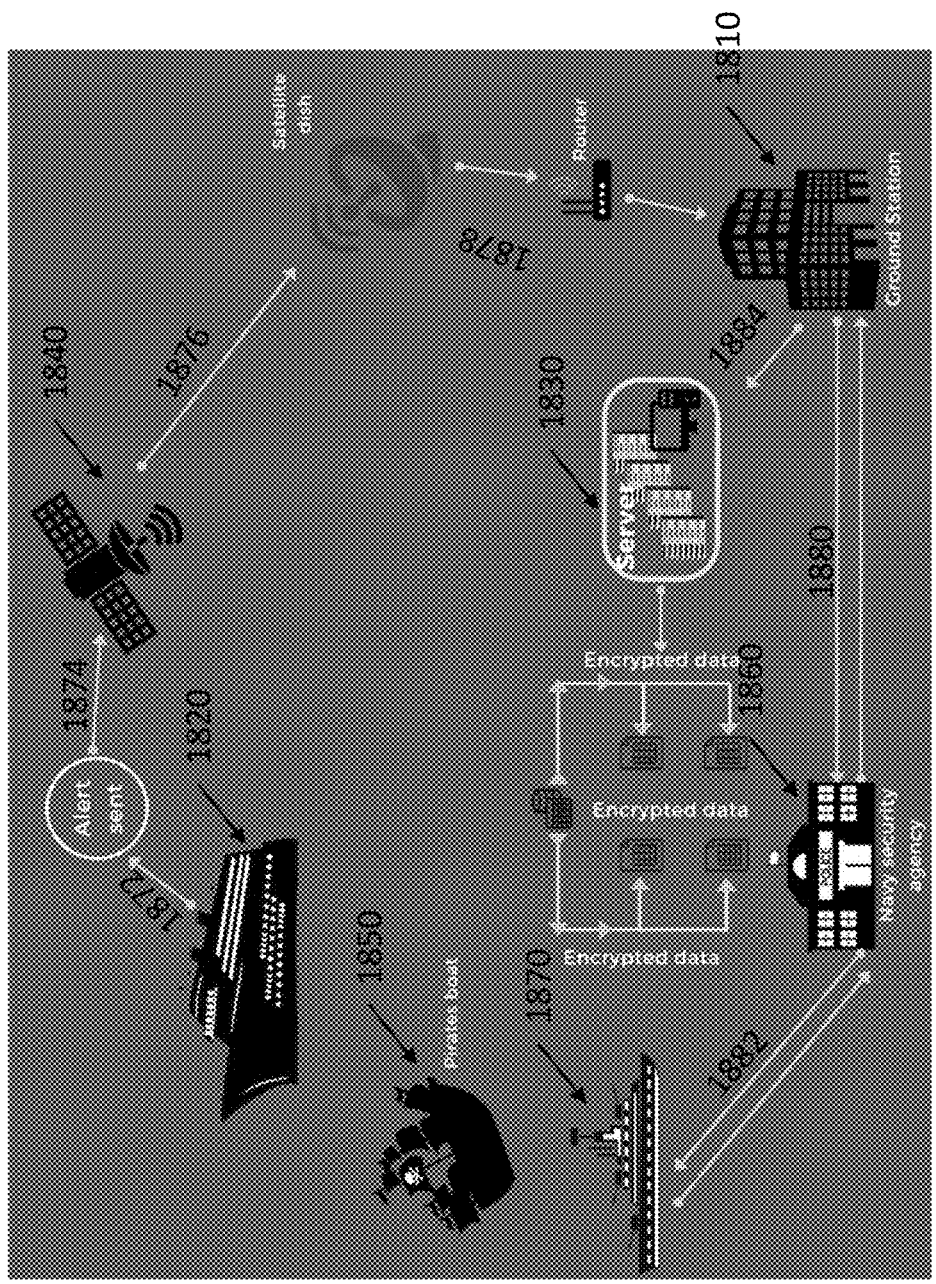
FIG. 18 is a block diagram illustrating an application of the satellite communication system of FIG. 14 to the marine industry in accordance with embodiments of this disclosure.

As another application of the satellite communication system 1400 of FIG. 14, provided in FIG. 18 is a marine system in accordance with embodiments of this disclosure. A ground station 1810, a water vehicle 1820, and a server 1830 correspond to the first station 1410, the second station 1420, and the one or more servers 1430 of FIG. 14, respectively. The water vehicle 1820 receives an access key from the server 1830 before leaving a port. The access key may be valid for the entire trip taken by the water vehicle 1820.

The water vehicle 1820 departs from the ground station 1810 and may encounter a potential pirate. In this case, the water vehicle 1820 may send an alert signal to the satellite 1840 using E2EE at step 1872. Since the alert signal is encrypted, the potential pirate boat may not be able to listen to the encrypted alert signal.

The satellite 1840 may transmit the alert signal to the ground station 1810 via a satellite dish at steps 1876 and 1878. The ground station 1810 may transmit the alert signal to a naval security agency 1860 at step 1880, which instructs a security vehicle 1870 to save the water vehicle 1820. The ground station 1810 may also send the alert signal to the server 1830 so as to save the alert signal in the hyper ledger. Further, the ground station 1810 may transmit all history including the potential piracy, emergency signal, and any related events in the hyper ledger. Thus, by using the hyper ledger based on the blockchain, data used in the marine industry is secured while piracy risks are minimized.

It should be understood that the foregoing description is only illustrative of this disclosure. Various alternatives and modifications can be devised by those skilled in the art without departing from the disclosure. Accordingly, this disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

The invention claimed is:

1. An e-key system comprising:
   a computing device incorporated into property; and
   a key fob configured to receive an encrypted code from a mobile device and to transmit the encrypted code to the computing device via wireless communication; and
   a server configured to update an access log of the key fob in a hyper ledger stored on the server,
   wherein the computing device includes a validation module configured to validate the encrypted code,
   wherein in response to the validation module validating the encrypted code, the computing device is further configured to transmit an access message to the key fob and to transmit a first access log message to the mobile device, wherein the first access log message causes the mobile device to transmit a second access log message to the server, and
   wherein the computing device grants a user of the key fob access to the property when the validation module validates the encrypted code.

2. The e-key system according to claim 1, wherein the wireless communication is Bluetooth communication.

3. The e-key system according to claim 1, wherein the mobile device and the key fob are paired according to a Bluetooth protocol.

4. The e-key system according to claim 1, wherein the computing device and the key fob are paired according to a Bluetooth protocol.

5. The e-key system according to claim 1, wherein the validation module is constantly powered by the property.

6. The e-key system according to claim 5, wherein the validation module is an electronic circuit.

7. The e-key system according to claim 1, wherein the encrypted code is encrypted with a public key by the mobile device.

8. The e-key system according to claim 7, wherein the validation module decrypts the encrypted code with a private key, which is saved in the validation module, corresponding to the public key.

9. The e-key system according to claim 1, wherein the validation module transmits the access log to the server when a network connection is established with the server.

10. The e-key system according to claim 1, wherein the property is an aircraft, watercraft, hovering vehicle, land vehicle, or building.

11. A method for granting access to property to a user of a key fob, the method comprising:
   receiving, by a key fob, an encrypted code from a mobile device;
   transmitting, by the key fob, the encrypted code to a validation module running on a computing device incorporated into property via wireless communication;

determining, by the validation module, whether the encrypted code is valid;

granting access to the property when it is determined that the encrypted code is valid;

denying access to the property when it is determined that the encrypted code is invalidi in response to the validation module determining that the encrypted code is valid or invalid, transmitting, by the computing device, an access message to the key fob and a first access log message to the mobile device, wherein the first access log message causes the mobile device to transmit a second access log message to a server; and in response to receiving, by the server, the second access log message, updating, by the server, an access log of the key fob in a hyper ledger stored on the server.

12. The method according to claim 11, wherein the wireless communication is Bluetooth.

13. The method according to claim 11, wherein the property and the key fob are paired according to a Bluetooth protocol.

14. The method according to claim 11, wherein the mobile device and the key fob are paired according to a Bluetooth protocol.

15. The method according to claim 11, wherein the encrypted code is encrypted by a public key.

16. The method according to claim 15, further comprising decrypting, by the validation module, the encrypted code with a private key, which is saved in the validation module, corresponding to the public key.

17. The method according to claim 11, further comprising transmitting, by the validation module, an access log to a server when a network connection is established with the server.

18. The method according to claim 11, wherein the property is an aircraft, watercraft, hovering vehicle, land vehicle, or building.

* * * * *